US009397533B2

(12) United States Patent
Takuno et al.

(10) Patent No.: US 9,397,533 B2
(45) Date of Patent: Jul. 19, 2016

(54) SPEED REDUCTION MECHANISM, AND MOTOR TORQUE TRANSMISSION DEVICE INCLUDING THE SPEED REDUCTION MECHANISM

(71) Applicant: JTEKT Corporation, Osaka-shi (JP)

(72) Inventors: Hiroshi Takuno, Nukata-gun (JP); Kunihiko Suzuki, Gamagori (JP); Tomoyoshi Takai, Kariya (JP); Keita Nomura, Kariya (JP); Motoyasu Yamamori, Nagoya (JP); Tsune Kobayashi, Okazaki (JP); Tohru Onozaki, Nagoya (JP); Masaharu Tagami, Kashihara (JP)

(73) Assignee: JTEKT CORPORATION, Osaka-shi (JP)

( * ) Notice: Subject to any disclaimer, the term of this patent is extended or adjusted under 35 U.S.C. 154(b) by 550 days.

(21) Appl. No.: 13/850,393

(22) Filed: Mar. 26, 2013

(65) Prior Publication Data
US 2013/0257202 A1   Oct. 3, 2013

(30) Foreign Application Priority Data
Mar. 28, 2012  (JP) ................. 2012-074610

(51) Int. Cl.
*H02K 7/116* (2006.01)
*F16H 1/32* (2006.01)
*B60K 1/00* (2006.01)

(52) U.S. Cl.
CPC ............... *H02K 7/116* (2013.01); *F16H 1/32* (2013.01); *B60K 1/00* (2013.01); *F16H 2001/325* (2013.01)

(58) Field of Classification Search
CPC ....... B60K 1/00; F16H 1/32; F16H 2001/325; H02K 7/116

USPC .................................. 310/83; 475/178, 159
See application file for complete search history.

(56) References Cited

U.S. PATENT DOCUMENTS 2,170,951 A * 8/1939 Perry .................... F16H 1/32
                                                        475/159
4,656,891 A * 4/1987 Durand ................ F16H 57/082
                                                        475/179
(Continued)

FOREIGN PATENT DOCUMENTS

EP  0 556 587 A1  8/1993
EP  2 292 946 A1  3/2011
(Continued)

OTHER PUBLICATIONS

U.S. Appl. No. 13/933,449, filed Jul. 2, 2013, Nomura, et al.
(Continued)

*Primary Examiner* — Alex W Mok
(74) *Attorney, Agent, or Firm* — Oblon, McClelland, Maier & Neustadt, L.L.P.

(57) ABSTRACT

In a reduction-transmission mechanism, an input member is arranged at such a position that a size obtained by adding a fitting clearance formed between a ball bearing and an outer periphery of an eccentric portion, a fitting clearance formed between the ball bearing and an inner periphery of the input member, which defines a center hole, and a radial internal clearance of the ball bearing is smaller than a size obtained by adding a fitting clearance formed between an outer periphery of each of a plurality of output members and a corresponding one of needle roller bearings, a fitting clearance formed between each of the needle roller bearings and an inner periphery of the input member, which defines a corresponding one of a plurality of pin insertion holes, and a radial internal clearance of each of the needle roller bearings.

14 Claims, 15 Drawing Sheets

(56) References Cited

U.S. PATENT DOCUMENTS

| | | | | |
|---|---|---|---|---|
| 5,286,237 | A * | 2/1994 | Minegishi | 475/178 |
| 7,794,350 | B2 * | 9/2010 | Akiyama | F16H 1/46 475/178 |
| 8,721,484 | B2 * | 5/2014 | Suzuki | F16H 1/32 475/178 |
| 2002/0111243 | A1 * | 8/2002 | Minegishi | F16H 1/32 475/178 |
| 2005/0059524 | A1 * | 3/2005 | Hori | F16H 1/32 475/180 |
| 2007/0060440 | A1 * | 3/2007 | Lee | B62M 6/40 475/337 |
| 2011/0245030 | A1 * | 10/2011 | Wakida | F16H 1/32 475/331 |
| 2011/0259133 | A1 * | 10/2011 | Kobayashi | F16H 1/32 74/325 |
| 2011/0319219 | A1 * | 12/2011 | Suzuki | B60K 7/0007 475/168 |
| 2012/0006608 | A1 * | 1/2012 | Suzuki | B60K 7/0007 180/65.51 |
| 2012/0329596 | A1 * | 12/2012 | Nomura | F16H 1/32 475/149 |
| 2012/0329597 | A1 * | 12/2012 | Nomura | F16H 1/32 475/150 |
| 2013/0045827 | A1 * | 2/2013 | Kobayashi et al. | 475/149 |

FOREIGN PATENT DOCUMENTS

| | | |
|---|---|---|
| JP | 2007-218407 | 8/2007 |
| WO | WO 2011/099636 A1 | 8/2011 |

OTHER PUBLICATIONS

Extended European Search Report issued Jul. 15, 2013 in Patent Application No. 13161019.8.

* cited by examiner

SPEED REDUCTION MECHANISM, AND MOTOR TORQUE TRANSMISSION DEVICE INCLUDING THE SPEED REDUCTION MECHANISM

INCORPORATION BY REFERENCE

The disclosure of Japanese Patent Application No. 2012-074610 filed on Mar. 28, 2012 including the specification, drawings and abstract, is incorporated herein by reference in its entirety.

BACKGROUND OF THE INVENTION

1. Field of the Invention

The invention relates to a speed reduction mechanism that is suitably used in, for example, an electric vehicle that has an electric motor as a driving source, and a motor torque transmission device that includes the speed reduction mechanism.

2. Description of Related Art

There is a conventional motor torque transmission device that is mounted on a vehicle, and that includes an electric motor and a reduction-transmission mechanism (see, for example, Japanese Patent Application Publication No. 2007-218407 (JP 2007-218407 A)). The electric motor generates motor torque. The reduction-transmission mechanism reduces the speed of rotation transmitted from the electric motor and then transmits driving force to a differential mechanism.

The reduction-transmission mechanism of the motor torque transmission device of the above-described type has a pair of disc-shaped revolving members, a plurality of outer pins and a plurality of inner pins. The revolving members make revolving motions in accordance with the rotation of the motor shaft of the electric motor. The motor shaft has eccentric portions. The outer pins apply rotation force to the revolving members. The inner pins are arranged radially inward of the outer pins, and output the rotation force of the revolving members to the differential mechanism as torque.

The revolving members each have a center hole and a plurality of pin insertion holes. Each center hole extends along the central axis direction of the corresponding revolving member and opens toward both sides of the revolving member in the central axis direction. The pin insertion holes are arranged around the central axis of the corresponding center hole at equal intervals. The revolving members are rotatably supported by the eccentric portions of the motor shaft via bearings (cam-side bearings).

The outer pins are arranged at equal intervals around the axis of the motor shaft with the eccentric portions, and are fitted to a housing for the reduction-transmission mechanism.

The inner pins are passed through the pin insertion holes of the revolving members. The inner pins are arranged at equal intervals around the axis of the motor shaft with the eccentric portions, and are fitted to the differential case. Bearings (pin-side bearings) are fitted to the inner pins. The bearings are used to reduce contact resistance between the inner pins and the inner peripheries which define the pin insertion holes of the revolving members.

In the motor torque transmission device described in JP 2007-218407 A, a plurality of the outer pins need to be prepared, and, in addition, the outer peripheral portions of the revolving members need to be formed into a complex shape. Therefore, employing the motor torque transmission device described in JP 2007-218407 A is not economical.

The above-described non-economical factor may be eliminated by forming a reduction-transmission mechanism as follows. That is, revolving members are formed of external gears, a rotation force applying member used to apply rotation force to the revolving members is formed of an internal gear, and the number of teeth of the internal gear is set larger than the number of teeth of each of the external gears.

However, if the above-described reduction-transmission mechanism formed of the external gears and the internal gear is used in a motor torque transmission device for a vehicle, the revolving speed of each of the external gears that are the revolving members becomes relatively high. Therefore, a load due to centrifugal force acts on the pin-side bearings from the revolving members when the torque. Accordingly, bearings having high durability need to be used as the pin-side bearings, resulting in cost increase. In addition, if a load due to centrifugal force acts on the pin-side bearings, the service life of each pin-side bearing decreases.

SUMMARY OF THE INVENTION

It is an object of the invention to provide a speed reduction mechanism configured to contribute to cost reduction and enhancement of the service life of bearings, and a motor torque transmission device that includes the speed reduction mechanism.

An aspect of the invention relates to a speed reduction mechanism, including: a rotary shaft that rotates about a first axis and that has an eccentric portion of which a central axis is a second axis that is offset from the first axis; an input member that is arranged radially outward of the rotary shaft, that has a center hole of which a central axis is a third axis and a plurality of through-holes arranged at equal intervals around the third axis, and that is formed of an external gear provided with a first bearing interposed between an inner periphery of the input member, which defines the center hole, and an outer periphery of the eccentric portion; a rotation force applying member that is in mesh with the input member and that is formed of an internal gear having teeth the number of which is larger than the number of teeth of the external gear; and a plurality of output members that receive rotation force applied to the input member by the rotation force applying member, that output the rotation force to an output target as torque of the output target, and that are passed through the respective through-holes with second bearings provided radially outward of the respective output members. The input member is arranged at such a position that a size S obtained by adding a fitting clearance formed between the first bearing and the outer periphery of the eccentric portion, a fitting clearance formed between the first bearing and the inner periphery of the input member, which defines the center hole, and a radial internal clearance of the first bearing is smaller than a size S' obtained by adding a fitting clearance formed between an outer periphery of each of the output members and a corresponding one of the second bearings, a fitting clearance formed between each of the second bearings and an inner periphery of the input member, which defines a corresponding one of the through-holes, and a radial internal clearance of each of the second bearings.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 6A and FIG. 6B are simplified sectional views of states of operation of each input member of the speed reduction mechanism with respect to the output members of the speed reduction mechanism in the motor torque transmission device according to the first embodiment of the invention, wherein FIG. 6A shows an initial position of each input member, and FIG. 6B shows a moved position of each input member;

FIG. 7A and FIG. 7B are simplified sectional views of states of operation of an outer ring of each second bearing of the speed reduction mechanism with respect to a corresponding one of the output members of the speed reduction mechanism in the motor torque transmission device according to the first embodiment of the invention, wherein FIG. 7A is an initial position of the outer ring, and FIG. 7B shows a moved position of the outer ring;

FIG. 8A and FIG. 8B are simplified sectional views of states of operation of each input member of the speed reduction mechanism with respect to a corresponding one of the eccentric portions of the speed reduction mechanism in the motor torque transmission device according to the first embodiment of the invention, wherein FIG. 8A shows an initial position of each input member, and FIG. 8B shows a moved position of each input member;

DETAILED DESCRIPTION OF EMBODIMENTS

Hereinafter, a motor torque transmission device according to a first embodiment of the invention will be described in detail with reference to the accompanying drawings.

Figure 1:
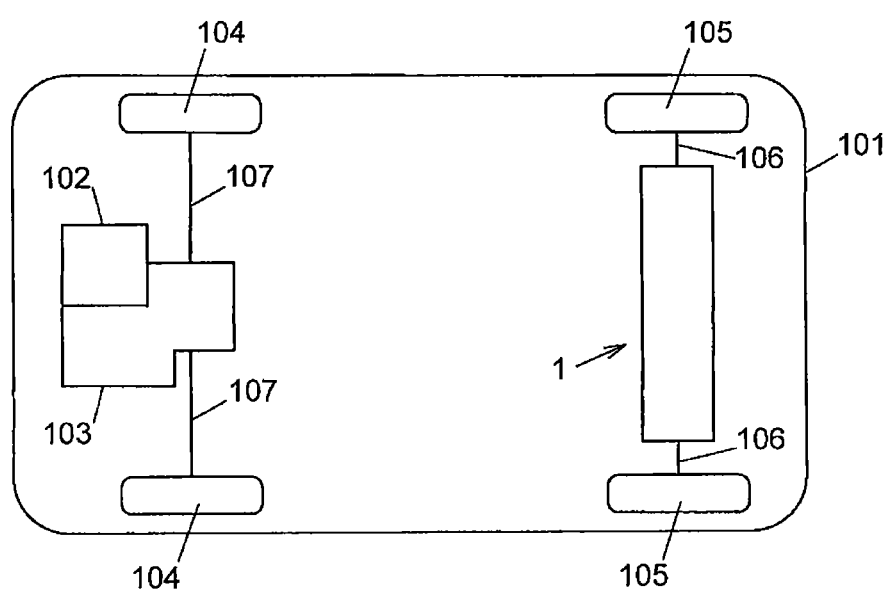
FIG. 1 is a schematic plan view for illustrating a vehicle on which a motor torque transmission device according to a first embodiment of the invention is mounted.

FIG. 1 schematically shows a four-wheel-drive vehicle 101. As shown in FIG. 1, the four-wheel-drive vehicle 101 has a front wheel power system and a rear wheel power system, and includes a motor torque transmission device 1, an engine 102, a transaxle 103, a pair of front wheels 104 and a pair of rear wheels 105. In the front wheel power system, the engine is used as a driving source. In the rear wheel power system, an electric motor is used as a driving source.

The motor torque transmission device 1 is arranged in the rear wheel power system of the four-wheel-drive vehicle 101, and is supported by a vehicle body (not shown) of the four-wheel-drive vehicle 101.

Figure 2:
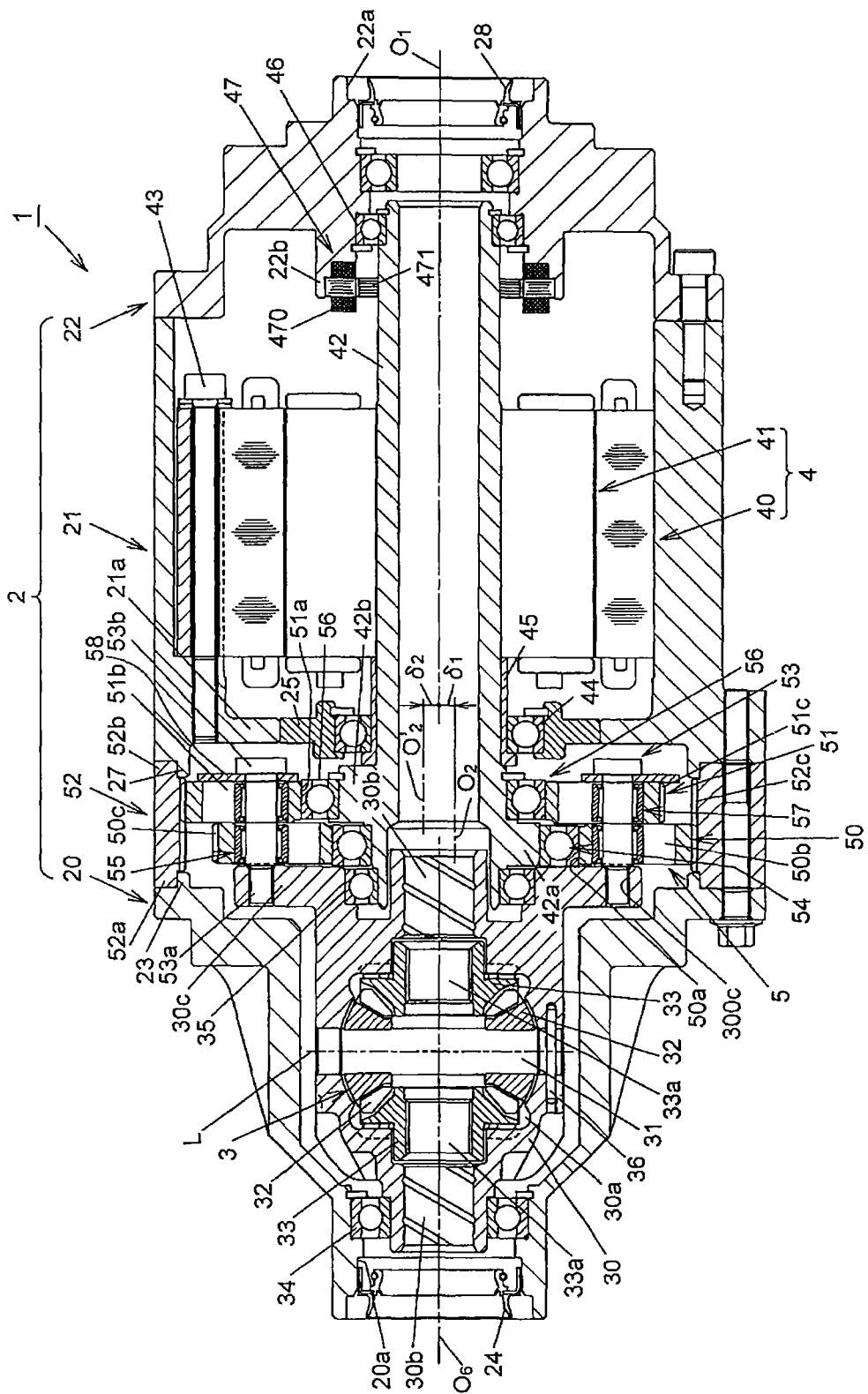
FIG. 2 is a sectional view for illustrating the motor torque transmission device according to the first embodiment of the invention.

The motor torque transmission device 1 transmits driving force based on the motor torque of the electric motor 4 (shown in FIG. 2) to the rear wheels 105. Thus, the motor torque of the electric motor 4 is transmitted to rear axle shafts 106 via a reduction-transmission mechanism 5 and a rear differential 3 (both are shown in FIG. 2) to drive the rear wheels 105. The details of the motor torque transmission device 1, and the like, will be described later.

The engine 102 is arranged in the front wheel power system of the four-wheel-drive vehicle 101. Thus, the driving force of the engine 102 is transmitted to front axle shafts 107 via the transaxle 103 to drive the front wheels 104.

FIG. 2 shows the overall view of the motor torque transmission device 1.

As shown in FIG. 2, the motor torque transmission device 1 is formed mainly of a housing 2, the rear differential 3, the electric motor 4 and the reduction-transmission mechanism 5. The housing 2 has a central axis that coincides with the axis (rotation axis $O_1$) of each rear axle shaft 106 (shown in FIG. 1). The rear differential 3 distributes driving force to the rear wheels 105 (shown in FIG. 1). The electric motor 4 generates motor torque for actuating the rear differential 3. The reduction-transmission mechanism 5 reduces the speed of rotation transmitted from the electric motor 4 and then transmits driving force to the rear differential 3.

The housing 2 has a rotation force applying member 52 (described later in detail), a first housing element 20, a second housing element 21 and a third housing element 22. The housing 2 is arranged on the vehicle body. The first housing element 20 accommodates the rear differential 3. The second housing element 21 accommodates the electric motor 4. The third housing element 22 closes a first opening portion of the second housing element 21 (an opening portion on the opposite side of the second housing element 21 from a first housing element 20-side opening portion (second opening portion)).

The first housing element 20 is arranged at a second side (left side in FIG. 2) of the housing 2. The entirety of the first housing element 20 is formed of a stepped closed-end cylindrical member that is open toward the second housing element 21. The bottom of the first housing element 20 has a shaft insertion hole 20a through which one of the rear axle shafts 106 (shown in FIG. 1) is passed. An annular protrusion 23 that protrudes toward the second housing element 21 is formed integrally on the open end face of the first housing element 20. The outer periphery of the protrusion 23 has an outside diameter smaller than the maximum outside diameter of the first housing element 20, and is formed of a cylindrical surface of which the central axis coincides with the rotation axis $O_1$. A seal member 24 is interposed between the inner periphery of the first housing element 20 and the outer periphery of the rear axle shaft 106. The seal member 24 seals the shaft insertion hole 20a.

The second housing element 21 is arranged at the middle of the housing 2 in the axial direction. The entirety of the second housing element 21 is formed of an open-end cylindrical member that is open toward both sides in the direction of the rotation axis $O_1$. A stepped inward flange 21 a, which is interposed between the electric motor 4 and the reduction-transmission mechanism 5, is formed integrally with the second opening portion of the second housing element 21 (the opening portion on the first housing element 20-side). An annular member 25, to which a race is fitted, is fitted to the inner periphery of the inward flange 21a. An annular protrusion 27, which protrudes toward the first housing element 20, is formed integrally on the second open end face of the second housing element 21 (the open end face on the first housing element 20-side). The outer periphery of the protrusion 27 has an outside diameter smaller than the maximum outside diameter of the second housing element 21. The protrusion 27 has substantially the same outside diameter as the outside diameter of the protrusion 23. The outer periphery of the protrusion 27 is formed of a cylindrical surface of which the central axis coincides with the rotation axis $O_1$.

The third housing element 22 is arranged at the first side (right side in FIG. 2) of the housing 2. The entirety of the third housing element 22 is formed of a stepped closed-end cylindrical member that is open toward the second housing element 21. The bottom of the third housing element 22 has a shaft insertion hole 22a through which the other one of the rear axle shafts 106 is passed. A cylindrical portion 22b, which protrudes toward the electric motor 4 and to which a stator is fitted, is formed integrally with the third housing element 22 so as to surround the inner opening of the shaft insertion hole 22a. A seal member 28 that seals the shaft insertion hole 22a is interposed between the inner periphery of the third housing element 22 and the outer periphery of the rear axle shaft 106.

The rear differential 3 is formed of a differential case 30 (output target), a pinion gear shaft 31 and a bevel gear differential mechanism. The differential mechanism is of a bevel gear type, and includes a pair of pinion gears 32 and a pair of side gears 33. The rear differential 3 is arranged at one side of the motor torque transmission device 1.

Thus, the torque of the differential case 30 is distributed from the pinion gear shaft 31 to the side gears 33 via the pinion gears 32. The torque of the differential case 30 is further transmitted from the side gears 33 to the right and left rear wheels 105 (shown in FIG. 1) via the rear axle shafts 106 (shown in FIG. 1).

When there arises a difference in driving resistance between the right and left rear wheels 105, the torque of the differential case 30 is differentially distributed to the right and left rear wheels 105 by the rotations of the pinion gears 32.

The differential case 30 is arranged on a rotation axis (sixth axis) $O_6$. The differential case 30 is rotatably supported by the first housing element 20 via a ball bearing 34, and is rotatably supported by a motor shaft (rotary shaft) 42 of the electric motor 4 via a ball bearing 35. Then, the differential case 30 receives driving force based on the motor torque of the electric motor 4 from the reduction-transmission mechanism 5 to rotate around the rotation axis $O_6$.

The differential case 30 has an accommodation space 30a and a pair of shaft insertion holes 30b. A differential mechanism unit (the pinion gear shaft 31, the pinion gears 32 and the side gears 33) is accommodated in the accommodation space 30a. The shaft insertion holes 30b communicate with the accommodation space 30a, and the right and left rear axle shafts 106 are passed through the shaft insertion holes 30b.

An annular flange 30c that faces the reduction-transmission mechanism 5 is formed integrally with the differential case 30. The flange 30c has a plurality of (six in the present embodiment) pin fitting holes 300c that are arranged at equal intervals around the rotation axis $O_6$.

The pinion gear shaft 31 is arranged along an axis L perpendicular to the rotation axis $O_6$ in the accommodation space 30a of the differential case 30. Rotation of the pinion gear shaft 31 about the axis L and movement of the pinion gear shaft 31 in the direction of the axis L are restricted by a pin 36.

The pinion gears 32 are rotatably supported by the pinion gear shaft 31, and are accommodated in the accommodation space 30a of the differential case 30.

The side gears 33 each have a shaft coupling hole 33a in which a corresponding one of the right and left rear axle shafts 106 (shown in FIG. 1) is spline-coupled. The side gears 33 are accommodated in the accommodation space 30a of the differential case 30. The side gears 33 are configured such that the gear axes are perpendicular to the gear axes of the pinion gears 32 and the side gears 33 are in mesh with the pinion gears 32.

The electric motor 4 includes a stator 40, a rotor 41 and the motor shaft 42, and is coupled, on the rotation axis $O_1$, to the rear differential 3 via the reduction-transmission mechanism 5. The stator 40 is connected to an electronic control unit (ECU) (not shown). The electric motor 4 is configured such that the stator 40 receives a control signal from the ECU, motor torque for driving the rear differential 3 is generated with the use to the stator 40 and the rotor 41, and the rotor 41 is rotated together with the motor shaft 42.

The stator 40 is arranged at the outer peripheral side of the electric motor 4, and is fitted to the inward flange 21a of the second housing element 21 with a fitting bolt 43.

The rotor 41 is arranged at the inner peripheral side of the electric motor 4, and is fitted to the outer periphery of the motor shaft 42.

The motor shaft 42 is arranged on the rotation axis $O_1$. In addition, the second end portion of the motor shaft 42 is rotatably supported by the inner periphery of the annular member 25 via a ball bearing 44 and a sleeve 45, and the first end portion of the motor shaft 42 is rotatably supported by the inner periphery of the third housing element 22 via a ball bearing 46. The entirety of the motor shaft 42 is formed of a cylindrical shaft member through which the rear axle shafts 106 (shown in FIG. 1) is passed.

An eccentric portion 42a and an eccentric portion 42b, both of which are circular in planar view, are formed integrally with the second end portion of the motor shaft 42. The central axis of the eccentric portion 42a is an axis (second axis) $O_2$ that is offset from the rotation axis $O_1$ of the motor shaft 42 by an eccentric amount $6_1$. The central axis of the eccentric portion 42b is an axis (second axis) $O'_2$ that is offset from the rotation axis $O_1$ by an eccentric amount $\delta_2$ ($\delta_1=\delta_2=\delta$). The eccentric portion 42a and the eccentric portion 42b are arranged so as to be apart from each other in the circumferential direction around the rotation axis $O_1$ at equal intervals (180°). That is, the eccentric portion 42a and the eccentric portion 42b are arranged on the outer periphery of the motor shaft 42 such that the distance from the axis $O_2$ to the rotation axis $O_1$ and the distance from the axis $O'_2$ to the rotation axis $O_1$ are equal to each other and the distance between the axis $O_2$ and the axis $O'_2$ in one of the circumferential directions around the rotation axis $O_1$ and the distance between the axis $O_2$ and the axis $O'_2$ in the other circumferential direction around the rotation axis $O_1$ are equal to each other. The eccentric portion 42a and the eccentric portion 42b are arranged so as to be next to each other along the rotation axis $O_1$.

A resolver 47 is arranged at the first end portion of the motor shaft 42. The resolver 47 serves as a rotation angle detector, and is interposed between the outer periphery of the motor shaft 42 and the inner periphery of the cylindrical portion 22b. The resolver 47 has a stator 470 and a rotor 471, and is accommodated inside the third housing element 22. The stator 470 is fitted to the inner periphery of the cylindrical portion 22b. The rotor 471 is fitted to the outer periphery of the motor shaft 42.

Figure 3:
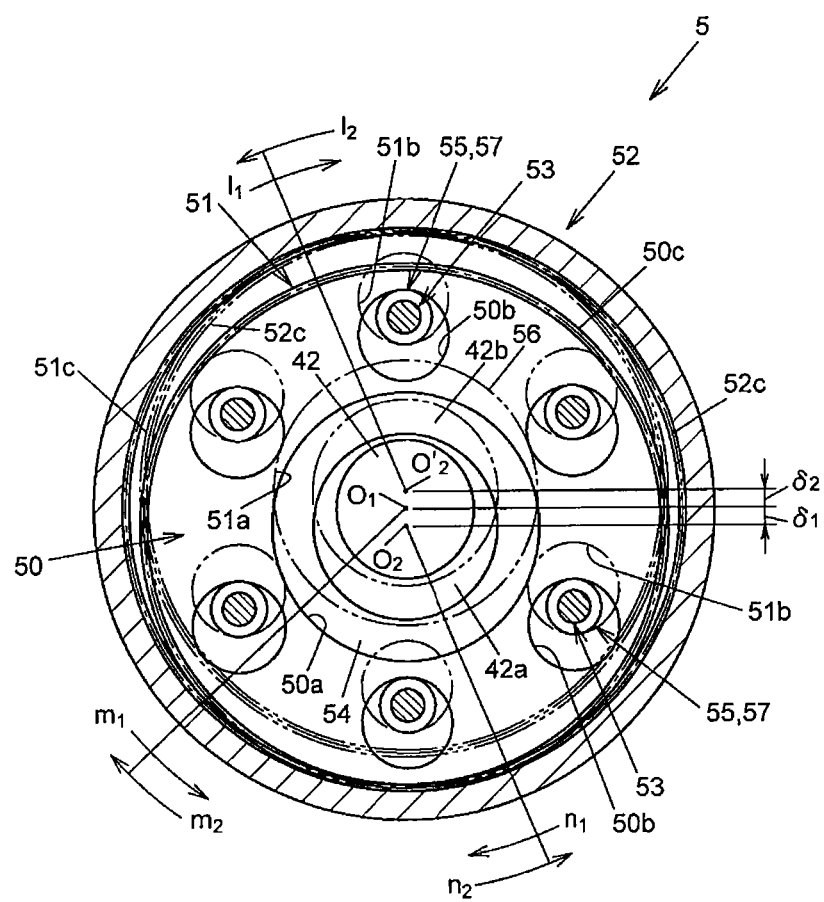
FIG. 3 is a schematic sectional view for illustrating a speed reduction mechanism of the motor torque transmission device according to the first embodiment of the invention.
Figure 4:
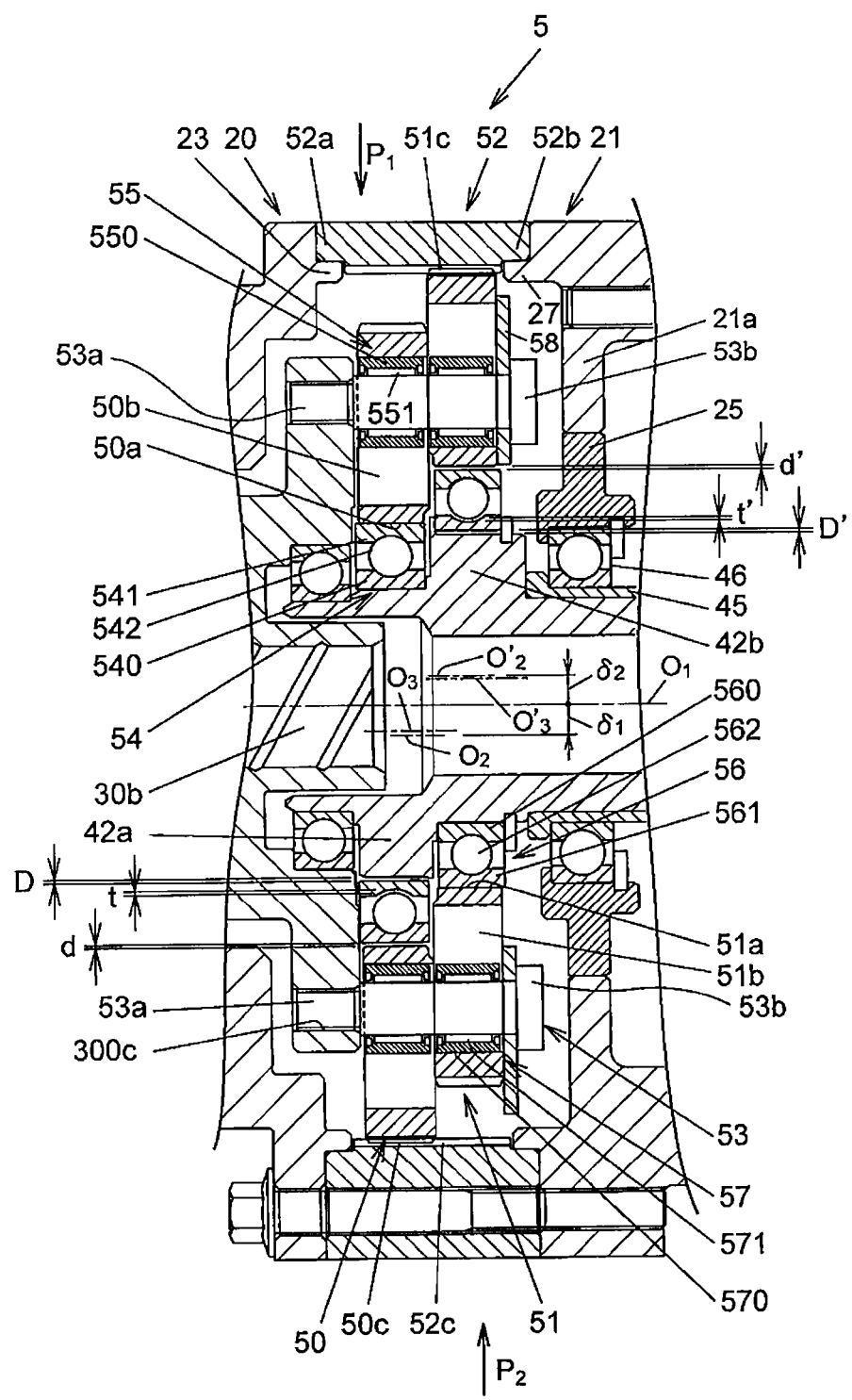
FIG. 4 is a schematic sectional view for illustrating main portions of the speed reduction mechanism in the motor torque transmission device according to the first embodiment of the invention.
Figure 5:
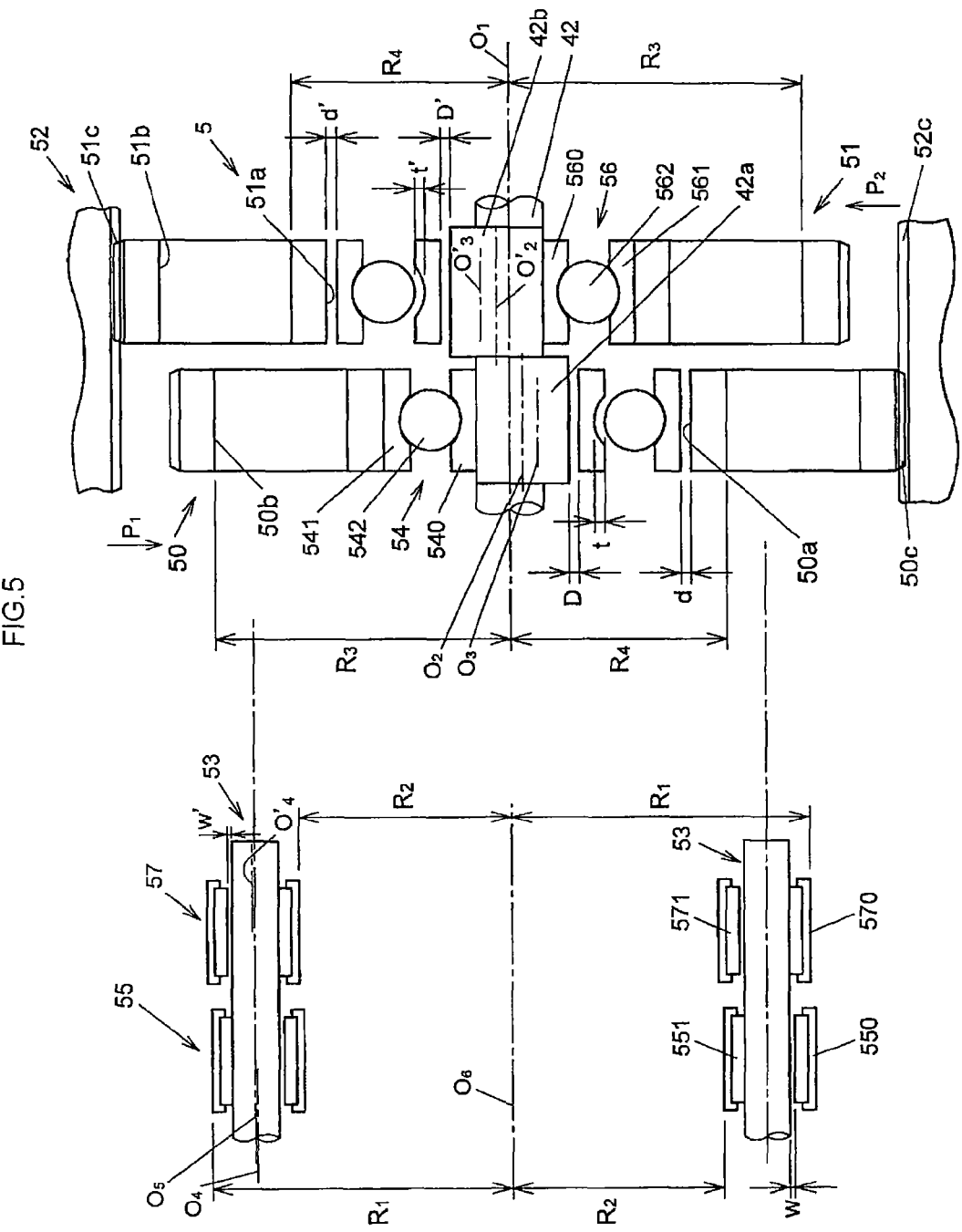
FIG. 5 is a sectional view that shows a state where input members are supported by eccentric portions of the speed reduction mechanism and a state where second bearings are fitted to output members in the motor torque transmission device according to the first embodiment of the invention.

FIG. 3 and FIG. 4 show the reduction-transmission mechanism. FIG. 5 shows a state where input members are supported and a state where second bearings are fitted. As shown in FIG. 3 to FIG. 5, the reduction-transmission mechanism 5 has a pair of input members 50, 51, the rotation force applying member 52 and a plurality of (six in the present embodiment) output members 53. The reduction-transmission mechanism 5 is interposed between the rear differential 3 and the electric motor 4 (both are shown in FIG. 2). As described above, the reduction-transmission mechanism 5 reduces the speed of rotation transmitted from the electric motor 4 and then transmits driving force to the rear differential 3.

As shown in FIG. 4, the input member 50 is formed of an external gear that has a center hole 50a of which the central axis coincides with an axis (third axis) $O_3$. The input member 50 is arranged so as to be closer to the rear differential 3 (shown in FIG. 3) than the input member 51. In addition, the input member 50 is rotatably supported by the motor shaft 42 via a ball bearing 54. The ball bearing 54 serves as a first bearing and is interposed between the inner periphery of the input member 50, which defines the center hole 50a, and the eccentric portion 42a. The input member 50 makes circular motion (revolving motion about the rotation axis $O_1$) in the direction of the arrows $m_1$, $m_2$ (shown in FIG. 3) with the eccentric amount $\delta$, upon reception of motor torque from the electric motor 4. The ball bearing 54 includes an inner ring 540 and an outer ring 541 that serve as two races, and rolling elements 542. The inner ring 540 is arranged radially inward of the outer ring 541. The rolling elements 542 roll between the inner ring 540 and the outer ring 541. The inner ring 540 is fitted to the eccentric portion 42a with a clearance (gap) in the radial direction of the motor shaft 42. The outer ring 541 is fitted to the inner periphery of the input member 50, which defines the center hole 50a, with a clearance (gap) in the radial direction of the motor shaft 42. That is, the inner ring 540 is fitted to the outer periphery of the eccentric portion 42a by clearance fit, and the outer ring 541 is fitted to the inner periphery of the input member 50, which defines the center hole 50a, by clearance fit. FIG. 4 shows a state where a centrifugal force $P_1$ acts on the input member 50, the inner ring 540, the outer ring 541 and the rolling elements 542.

The input member 50 has a plurality of (six in the present embodiment) pin insertion holes (through-holes) 50b that are arranged around the axis $O_3$ at equal intervals. The hole diameter of each pin insertion hole 50b is set to a value that is larger than a value obtained by adding the outside diameter of a needle roller bearing 55, which serves as a second bearing, to the outside diameter of each output member 53. The outside diameter of each needle roller bearing 55 is set to a value that is smaller than the outside diameter of the ball bearing 54. External teeth 50c, having an involute tooth profile, are formed on the outer periphery of the input member 50.

The external teeth 50c are configured such that both tooth flanks (both tooth flanks in the circumferential direction of the input member 50) of each external tooth 50c function as a revolving force applying face and a rotation force receiving face with respect to both tooth flanks (both tooth flanks in the circumferential direction of the rotation force applying member 52) of each internal tooth 52c of the rotation force applying member 52. The number Z1 of the external teeth 50c is set to 195 (Z1=195), for example.

As shown in FIG. 4, the input member 51 is formed of an external gear that has a center hole 51a of which the central axis coincides with an axis (third axis) $O'_3$. The input member 51 is arranged so as to be closer to the electric motor 4 (shown in FIG. 2) than the input member 50. In addition, the input member 51 is rotatably supported by the motor shaft 42 via a ball bearing 56. The ball bearing 56 serves as a first bearing arranged between the inner periphery of the input member 51, which defines the center hole 51a, and the eccentric portion 42b. The input member 51 makes circular motion (revolving motion about the rotation axis $O_1$) in the direction of arrows $m_1$, $m_2$ (shown in FIG. 3) with the eccentric amount 6, upon reception of motor torque from the electric motor 4. The ball bearing 56 includes an inner ring 560 and an outer ring 561 that serve as two races, and rolling elements 562. The inner ring 560 is arranged radially inward of the outer ring 561. The rolling elements 562 roll between the inner ring 560 and the outer ring 561. The inner ring 560 is fitted to the eccentric portion 42b with a clearance (gap) in the radial direction of the motor shaft 42. The outer ring 561 is fitted to the inner periphery of the input member 51, which defines the center hole 51a, with a clearance (gap) in the radial direction of the motor shaft 42. That is, the inner ring 560 is fitted to the outer periphery of the eccentric portion 42b by clearance fit, and the outer ring 561 is fitted to the inner periphery of the input member 51, which defines the center hole 51a, by clearance fit. FIG. 4 shows a state where a centrifugal force $P_2$ acts on the input member 51, the inner ring 560, the outer ring 561 and the rolling elements 562.

The input member 51 has a plurality of (six in the present embodiment) pin insertion holes (through-holes) 51b that are arranged at equal intervals around the axis $O'_3$. The hole diameter of each pin insertion hole 51b is set to a value that is larger than a value obtained by adding the outside diameter of a needle roller bearing 57, which serves as the second bearing, to the outside diameter of each output member 53. The outside diameter of each needle roller bearing 57 is set to a value that is smaller than the outside diameter of the ball bearing 56. External teeth 51c, having an involute tooth profile, are formed on the outer periphery of the input member 51.

The external teeth 51c are configured such that both tooth flanks (both tooth flanks in the circumferential direction of the input member 51) of each external tooth 51c function as a revolving force applying face and a rotation force receiving face with respect to tooth flanks (tooth flanks in the circumferential direction of the rotation force applying member 52) of each internal tooth 52c of the rotation force applying member 52. The number Z2 of the external teeth 51c is set to 195, for example.

The rotation force applying member 52 is formed of an internal gear of which the central axis coincides with the rotation axis $O_1$. The rotation force applying member 52 is interposed between the first housing element 20 and the second housing element 21. The rotation force applying member 52 is formed of an open-end cylindrical member that constitutes part of the housing 2 as a whole. The open-end cylindrical member is open toward both sides in the direction of the rotation axis $O_1$. The rotation force applying member 52 is in mesh with the input members 50, 51, and applies rotation force in the direction of the arrow $n_1$ or the arrow $n_2$ to the input member 50 that revolves upon reception of the motor torque of the electric motor 4 and applies rotation force in the direction of the arrow $l_1$ or the arrow $l_2$ to the input member 51 that revolves upon reception of the motor torque of the electric motor 4.

The inner periphery of the rotation force applying member 52 has a first fitting portion 52a and a second fitting portion 52b that are located at a predetermined distance in the direction of the rotation axis $O_1$. The first fitting portion 52a is fitted to the outer periphery 23b of the protrusion 23. The second fitting portion 52b is fitted to the outer periphery 27b of the protrusion 27. In addition, the inner periphery of the rotation force applying member 52 has internal teeth 52c having an involute tooth profile. The internal teeth 52c are located between the first fitting portion 52a and the second fitting portion 52b, and are in mesh with the external teeth 50c of the input member 50 and the external teeth 51c of the input member 51.

Both tooth flanks of each internal tooth 52c function as a rotation force applying face and a revolving force receiving face with respect to a tooth flank of each external tooth 50c of the input member 50 and a tooth flank of each external tooth 51c of the input member 51. The number Z3 of the internal teeth 52c is set to 208, for example. Thus, the reduction gear ratio $\alpha$ of the reduction-transmission mechanism 5 is calculated according to $\alpha=Z2/(Z3-Z2)$.

Figure 6A:
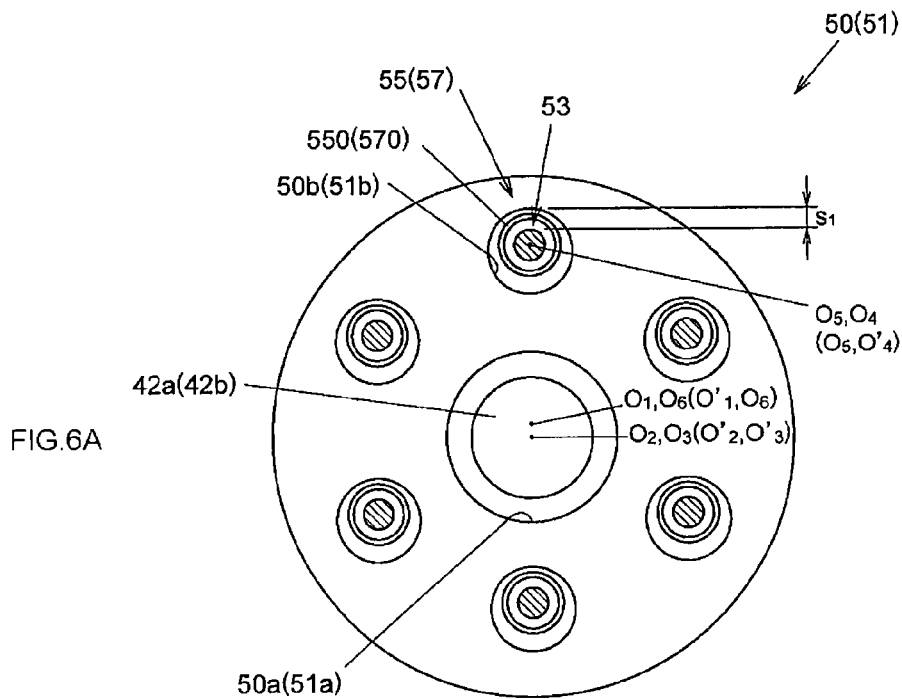
Figure 6B:
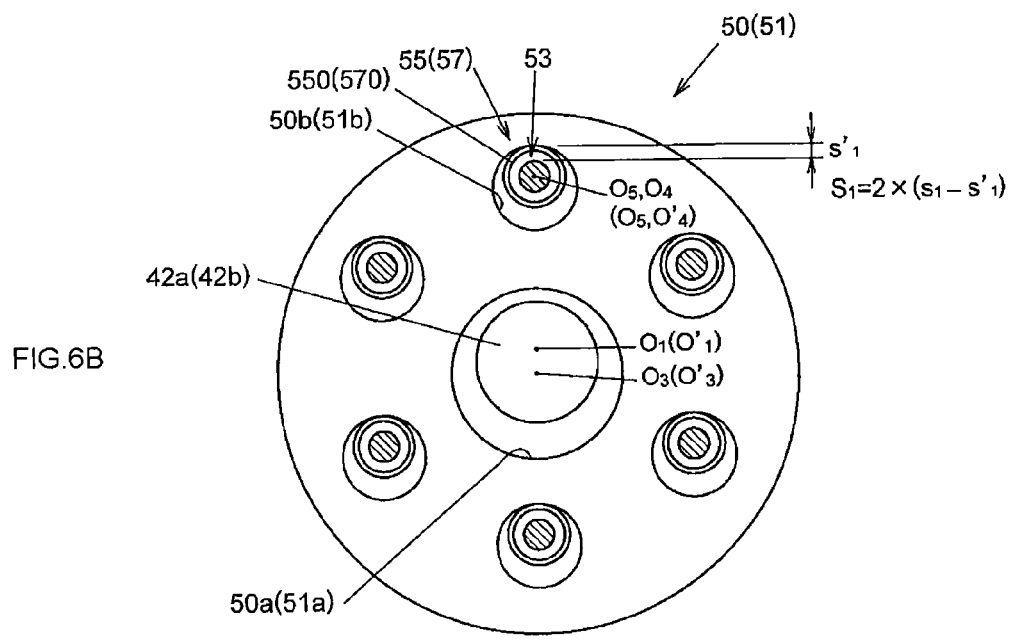
Figure 7A:
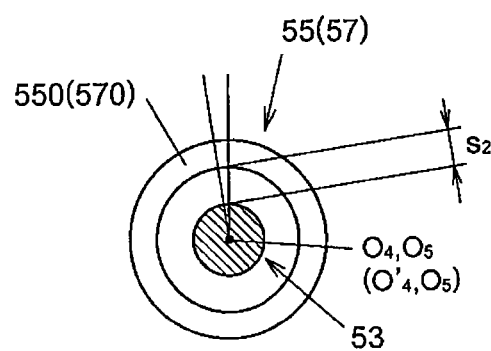
Figure 7B:
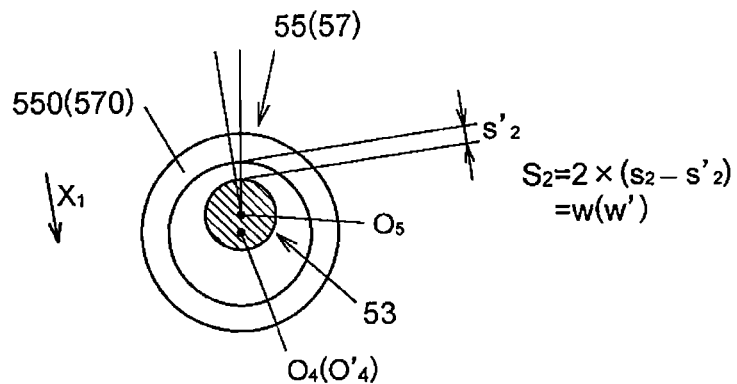
Figure 8A:
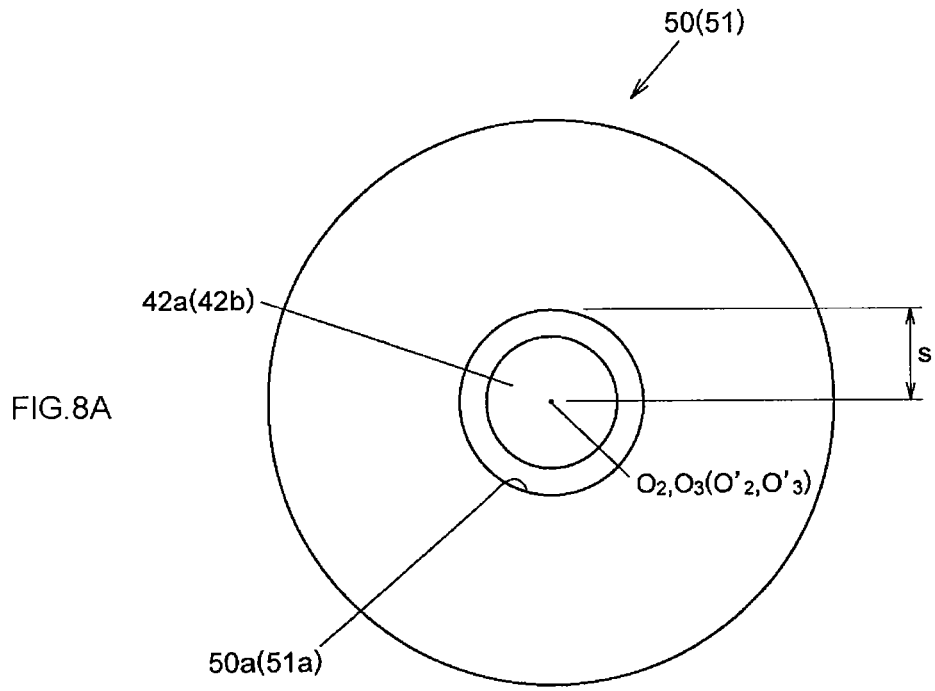
Figure 8B:
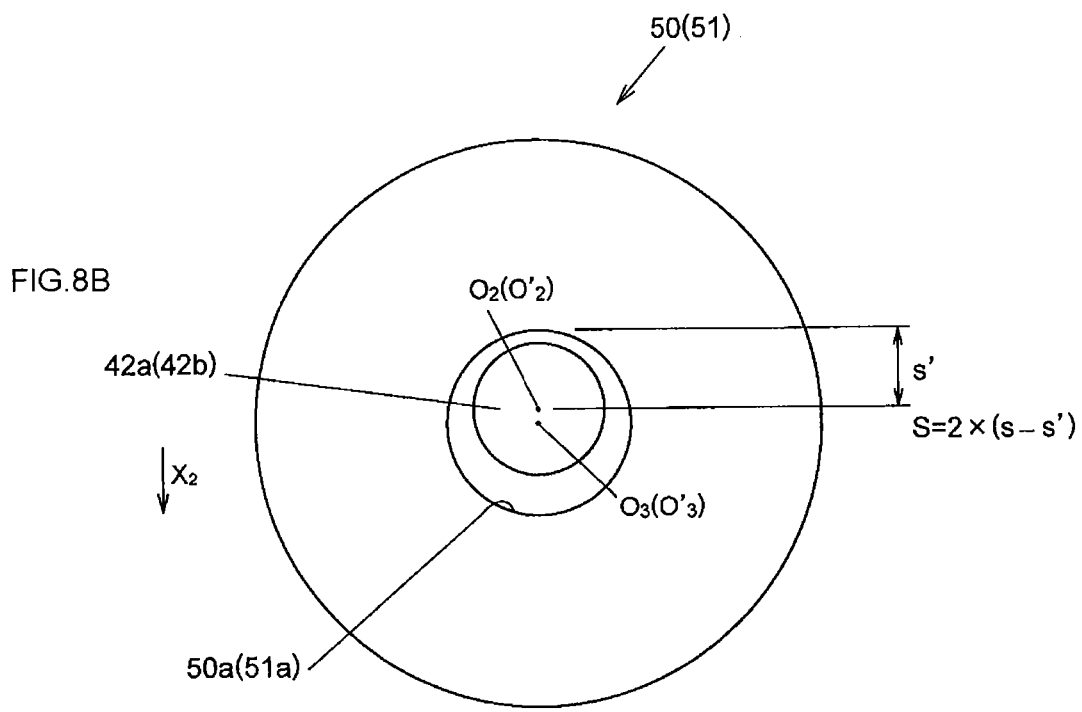

FIG. 6A and FIG. 6B show a fitting clearance of each second bearing. FIG. 7A and FIG. 7B show an operating clearance of a radial internal clearance of each second bearing. FIG. 8A and FIG. 8B show a fitting clearance of each first bearing and an operating clearance of a radial internal clearance of each first bearing. As shown in FIG. 2 and FIGS. 6A, 6B, FIGS. 7A, 7B and FIGS. 8A, 8B, the output members 53 are formed of bolts each having a threaded portion 53a at one end and a head 53b at the other end. The threaded portions 53a of the output members 53 are passed through the pin insertion holes 50b of the input member 50 and the pin insertion holes 51b of the input member 51 and then fitted in the pin mounting holes 300c of the differential case 30.

The output members 53 are arranged so as to be passed through an annular spacer 58 that is interposed between each head 53b and the input member 51. The output members 53 each are arranged at such a position that a size S' (not shown) obtained by adding fitting clearances $S_0$ (in the present embodiment, $S_0=0$), $S_1$ of each needle roller bearing 55 (57) with respect to the input member 50 (51) and a radial internal clearance $S_2$ ($S_2$=w: operating clearance) is larger than a size S obtained by adding fitting clearances $S_3$, $S_4$ (both are not shown) of each ball bearing 54 (56) with respect to the input member 50 (51) and a radial internal clearance S5 (S5=t: operating clearance) ($S=S_3+S_4+S_5<S_0+S_1+S_2=S'$). In other words, the input member 50 (51) is arranged at such a position that the size S is smaller than the size S'. Thus, when the input members 50, 51 move in the directions of the centrifugal forces $P_1$, $P_2$ upon reception of loads due to the centrifugal forces $P_1$, $P_2$ that are generated on the basis of the circular motions of the input members 50, 51, the inner peripheries of the input members 50, 51, which define the center holes 50a, 51a, contact the outer peripheries of the eccentric portions 42a, 42b via the ball bearings 54, 56 before the inner peripheries of the input members 50, 51, which define the pin insertion holes 50b, 51b, contact the outer peripheries of the output members 53 via the needle roller bearings 55, 57, respectively.

The fitting clearance $S_0$ is formed between the outer periphery of each output member 53 and an inscribed circle diameter of rollers of a corresponding one of the needle roller bearings 55, and is also formed between the outer periphery of each output member 53 and an inscribed circle diameter of rollers of a corresponding one of the needle roller bearings 57.

The fitting clearance $S_1$ is formed between the outer periphery of the outer ring 550 of each needle roller bearing 55 and the inner periphery of the input member 50, which defines the corresponding one of the pin insertion holes 50b, at a position at which the outer periphery of the outer ring 550 is closest to the inner periphery of the input member 50, which defines the pin insertion hole 50b. Similarly, the fitting clearance $S_1$ is formed between the outer periphery of the outer ring 570 of each needle roller bearing 57 and the inner periphery of the input member 51, which defines the corresponding one of the pin insertion holes 51b, at a position at which the outer periphery of the outer ring 570 is closest to the inner periphery of the input member 51, which defines the pin insertion hole 51b The fitting clearance $S_3$ is formed between the inner periphery of the input member 50, which defines the center hole 50a, and the outer periphery of the outer ring 541 of the ball bearing 54. Similarly, the fitting clearance $S_3$ is formed between the inner periphery of the input member 51, which defines the center hole 51a, and the outer periphery of the outer ring 561 of the ball bearing 56.

The fitting clearance S4 is formed between the inner periphery of the inner ring 540 of the ball bearing 54 and the outer periphery of the eccentric portion 42a. Similarly, the fitting clearance S4 is formed between the inner periphery of the inner ring 560 of the ball bearing 56 and the outer periphery of the eccentric portion 42b.

The output members 53 receive rotation force, applied by the rotation force applying member 52, from the input members 50, 51, and then output the rotation force to the differential case 30 as the torque of the differential case 30.

The needle roller bearing 55 is fitted to the outer periphery of each output member 53 at a portion between the threaded portion 53a and the head 53b. The needle roller bearing 55 is used to reduce contact resistance between each output member 53 and the inner periphery, which defines the corresponding pin insertion hole 50b of the input member 50. Similarly, the needle roller bearing 57 is fitted to the outer periphery of each output member 53 at a portion between the threaded portion 53a and the head 53b. The needle roller bearing 57 is used to reduce contact resistance between each output member 53 and the inner periphery, which defines the corresponding pin insertion hole 51b of the input member 51.

The needle roller bearings 55 each have an inner ring raceway surface on the outer periphery of a corresponding one of the output members 53, and each have a race (outer ring) 550 and needle rollers 551. The race 550 is able to contact the inner periphery, which defines a corresponding one of the pin insertion holes 50b of the input member 50. The needle rollers 551 roll between the inner periphery of the race 550 and the inner ring raceway surface of a corresponding one of the output members 53. The needle roller bearings 57 each have an inner ring raceway surface on the outer periphery of a corresponding one of the output members 53, and each have a race 570 and needle rollers 571. The race 570 is able to contact the inner periphery, which defines a corresponding one of the pin insertion holes 51b of the input member 51. The needle rollers 571 roll between the inner periphery of the race 570 and the inner ring raceway surface of a corresponding one of the output members 53.

The fitting clearance $S_o + S_1$ (in the present embodiment, because $S_0=0$, $S_0+S_1=S_1$), the radial internal clearance $S_2$ of each second bearing (needle roller bearing 55, 57) and the size S ($S=S_3+S_4+S_5$) will be described separately for the input member 50 and the input member 51.

On the input member 50 side, as shown in FIG. 6A and FIG. 6B, the fitting clearance $S_1$ is set to a size ($S_1=2\times(s_1-s'_1)$) that is obtained by doubling a distance from an initial position (position shown in FIG. 6A) of each output member 53 to a position (position shown in FIG. 6B) at which the output member 53 is located closest to the inner periphery, which defines a corresponding one of the pin insertion holes 50b, after being moved relative to the input member 50 in a state where an axis (fifth axis) $O_5$ coincides with an axis (fourth axis) $O_4$ of the outer ring 550. At the initial position, in a state where the axis $O_5$ and the axis $O_4$, the rotation axis $O_6$ and the rotation axis $O_1$, and the axis $O_2$ and the axis $O_3$ respectively coincide with each other, each output member 53 is arranged at one side in an aperture plane (upper side in an aperture plane in FIG. 6A) of a corresponding one of the pin insertion holes 50b.

As shown in FIG. 7A and FIG. 7B, the radial internal clearance $S_2$ is set to a size ($S_2=2\times(s_2-s'_2)$) that is obtained by doubling a distance from a position (initial position shown in FIG. 7A), at which the outer ring 550 of the needle roller bearing 55 is located such that its axis $O_4$ coincides with the axis (fifth axis) $O_5$ of the output member 53, to a position (moved position shown in FIG. 7B) at which the outer ring 550 of the needle roller bearing 55 is located closest to the output member 53 after being moved in the radial direction (first direction $X_1$) of the output member 53. As shown in FIG. 5, when the size ($R_1-R_3$) from the initial position of the outer ring 550 to the moved position of the outer ring 550 is used, $S_2=2\times(R_1-R_3)$. In this case, the radial internal clearance $S_2$ is an operating clearance w of each needle roller bearing 55. The size $R_1$ is a distance from the axis $O_6$ to the outer periphery of the outer ring 550 (a portion farthest from the axis $O_6$) when the outer ring 550 is at the initial position. The size $R_3$ is a distance from the axis $O_6$ to the outer periphery of the outer ring 550 (a portion farthest from the axis $O_6$) when the outer ring 550 is at the moved position.

As shown in FIG. 8A and FIG. 8B, the size S is set to a size ($S=2\times(s-s')$) that is obtained by doubling a distance from a position (initial position shown in FIG. 8A), at which the input member 50 is located such that its axis $O_3$ coincides with the axis $O_2$, to a position (moved position shown in FIG. 8B) at which the input member 50 is located closest to the eccentric portion 42a after being moved in the radial direction (second direction $X_2$). In this case, as shown in FIG. 5, if a size obtained by subtracting the outside diameter of the eccentric portion 42a from the inside diameter of the inner ring 540 is D, a size obtained by subtracting the outside diameter of the outer ring 541 from the inside diameter of the input member 50, which defines the center hole 50a, is d, and the operating clearance of the radial internal clearance in the ball bearing 54 is t, the size S is expressed by $S=D+d+t$.

Similarly, on the input member 51 side, as shown in FIG. 6A and FIG. 6B, the fitting clearance $S_1$ is set to a size ($S_1=2\times(s_1-s'_1)$) that is obtained by doubling a distance from an initial position (position shown in FIG. 6A) of each output member 53 to a position (position shown in FIG. 6B) at which the output member 53 is located closest to the inner periphery, which defines a corresponding one of the pin insertion holes 51b, after being moved relative to the input member 51 in a state where the axis (fifth axis) $O_5$ coincides with an axis (fourth axis) $O'_4$ of the outer ring 570. At the initial position, in a state where the axis $O_5$ and the axis $O'_4$, the rotation axis $O_6$ and the rotation axis $O'_1$, and the axis $O'_2$ and the axis $O_3$ respectively coincide with each other, each output member 53 is arranged at one side in an aperture plane (upper side in an aperture plane in FIG. 6A) of a corresponding one of the pin insertion holes 51b.

As shown in FIG. 7A and FIG. 7B, the radial internal clearance $S_2$ is set to a size ($S_2=2\times(S_2-S'_2)$) that is obtained by doubling a distance from a position (initial position shown in FIG. 7A), at which the outer ring 570 of the needle roller bearing 57 is located such that its axis $O'_4$ coincides with the axis (fifth axis) $O_5$ of the output member 53, to a position (moved position shown in FIG. 7B) at which the outer ring 570 of the needle roller bearing 57 is located closest to the output member 53 after being moved in the radial direction (first direction $X_1$) of the output member 53. As shown in FIG. 5, when the size ($R_1-R_3$) from the initial position of the outer ring 570 to the moved position of the outer ring 570 is used, $S_2=2\times(R_1-R_3)$. In this case, the radial internal clearance $S_2$ is an operating clearance w' of each needle roller bearing 57. The size $R_1$ is a distance from the axis $O_6$ to the outer periphery of the outer ring 570 (a portion farthest from the axis $O_6$) when the outer ring 570 is at the initial position. The size $R_3$ is a distance from the axis $O_6$ to the outer periphery of the outer ring 570 (a portion farthest from the axis $O_6$) when the outer ring 570 is at the moved position.

As shown in FIG. 8A and FIG. 8B, the size S is set to a size ($S=2\times(s-s')$) that is obtained by doubling a distance from a position (initial position shown in FIG. 8A), at which the input member 51 is located such that its axis $O'_3$ coincides with the axis $O'_2$, to a position (moved position shown in FIG. 8B) at which the input member 51 is located closest to the eccentric portion 42b after being moved in the radial direction (second direction $X_2$). In this case, as shown in FIG. 5, if a size obtained by subtracting the outside diameter of the eccentric portion 42b from the inside diameter of the inner ring 560 is D', a size obtained by subtracting the outside diameter of the outer ring 561 from the inside diameter of the input member 51, which defines the center hole 51a, is d', and the operating clearance of the radial internal clearance in the ball bearing 56 is t', the size S is expressed by $S=D'+d'+t'$.

Next, the operation of the motor torque transmission device according to the present embodiment will be described with reference to FIG. 1 to FIG. 5.

In FIG. 2, when electric power is supplied to the electric motor 4 of the motor torque transmission device 1 to drive the electric motor 4, the motor torque is applied to the reduction-transmission mechanism 5 via the motor shaft 42. Thus, the reduction-transmission mechanism 5 is actuated.

Therefore, in the reduction-transmission mechanism 5, the input members 50, 51 each perform circular motion with the eccentric amount 6, for example, in the arrow $m_1$ direction shown in FIG. 3.

Accordingly, the input member 50 rotates about the axis $O_2$ (the direction of the arrow $n_1$ shown in FIG. 3) while the external teeth 50c are meshed with the internal teeth 52c of the rotation force applying member 52, and the input member 51 rotates about the axis O'$_2$ (the arrow l$_1$ direction shown in FIG. 3) while the external teeth 51c are meshed with the internal teeth 52c of the rotation force applying member 52. In this case, due to the rotation of the input members 50, 51, the inner peripheries of the input member 50, which define the pin insertion holes 50b, contact the races 550 of the needle roller bearings 55, and the inner peripheries of the input member 51, which define the pin insertion holes 51b, contact the races 570 of the needle roller bearings 57.

Therefore, the revolving motions of the input members 50, 51 are not transmitted to the output members 53 and only the rotating motions of the input members 50, 51 are transmitted to the output members 53. Rotation force resulting from the rotating motions is output from the input members 50, 51 to the differential case 30 as the torque of the differential case 30.

In this way, the rear differential 3 is actuated, and driving force based on the motor torque of the electric motor 4 is distributed to the rear axle shafts 106 shown in FIG. 1, and transmitted to the right and left rear wheels 105.

As the motor torque transmission device 1 operates, the centrifugal force P$_1$ acts on the input member 50 on the basis of the circular motion of the input member 50, and the centrifugal force P$_2$ acts on the input member 51 on the basis of the circular motion of the input member 51.

Accordingly, the input member 50 moves in a direction in which the centrifugal force P$_1$ acts (for example, downward in FIG. 5), and the input member 51 moves in a direction in which the centrifugal force P$_2$ acts (for example, upward in FIG. 5).

In this case, as shown in FIG. 4 and FIG. 5, when the input member 50 moves in the direction in which the centrifugal force P$_1$ acts, upon reception of a load due to the centrifugal force P$_1$ that is generated on the basis of the circular motion of the input member 50, the inner periphery of the input member 50, which defines the center hole 50a, contacts the outer periphery of the eccentric portion 42a via the ball bearing 54 before the inner peripheries of the input member 50, which define the pin insertion holes 50b, contact the outer peripheries of the output members 53 via the needle roller bearings 55. Thus, the load due to the centrifugal force P$_1$ from the input member 50 is intensively received by the ball bearing 54. Therefore, application of the load due to the centrifugal force P$_1$ from the input member 50 to the needle roller bearings 55 is suppressed.

Similarly, as shown in FIG. 4 and FIG. 5, when the input member 51 moves in the direction in which the centrifugal force P$_2$ acts, upon reception of a load due to the centrifugal force P$_2$ that is generated on the basis of the circular motion of the input member 51, the inner periphery of the input member 51, which defines the center hole 51a, contacts the outer periphery of the eccentric portion 42b via the ball bearing 56 before the inner peripheries of the input member 51, which define the pin insertion holes 51b, contact the outer peripheries of the output members 53 via the needle roller bearings 57. Thus, the load due to the centrifugal force P$_2$ from the input member 51 is intensively received by the ball bearing 56. Therefore, application of the load due to the centrifugal force P$_2$ from the input member 51 to the needle roller bearings 57 is suppressed.

Thus, in the present embodiment, it is no longer necessary to use bearings having high durability as the needle roller bearings 55, 57.

In the above-described embodiment, the description is made on the case where the motor torque transmission device 1 is actuated by causing the input members 50, 51 to perform circular motion in the direction of the arrow m$_1$. However, the motor torque transmission device 1 may be actuated in the same manner as that in the above-described embodiment even when the input members 50, 51 are caused to make circular motion in the direction of the arrow m$_2$ as shown in FIG. 3. In this case, the rotating motion of the input member 50 is made in the direction of the arrow n$_2$, and the rotating motion of the input member 51 is made in the direction of the arrow l$_2$.

According to the above-described first embodiment, the following advantageous effects are obtained.

(1) Application of the load due to the centrifugal force P$_1$ from the input member 50 to the needle roller bearings 55 and application of the load due to the centrifugal force P$_2$ from the input member 51 to the needle roller bearings 57 are suppressed. Therefore, it is no longer necessary to use bearings having high durability as the needle roller bearings 55, 57. Therefore, it is possible to reduce cost.

(2) Application of the load due to the centrifugal force P$_1$ to the needle roller bearings 55 and application of the load due to the centrifugal force P$_2$ to the needle roller bearings 57 are suppressed. Thus, it is possible to extend the service life of each of the needle roller bearings 55, 57.

Figure 9:
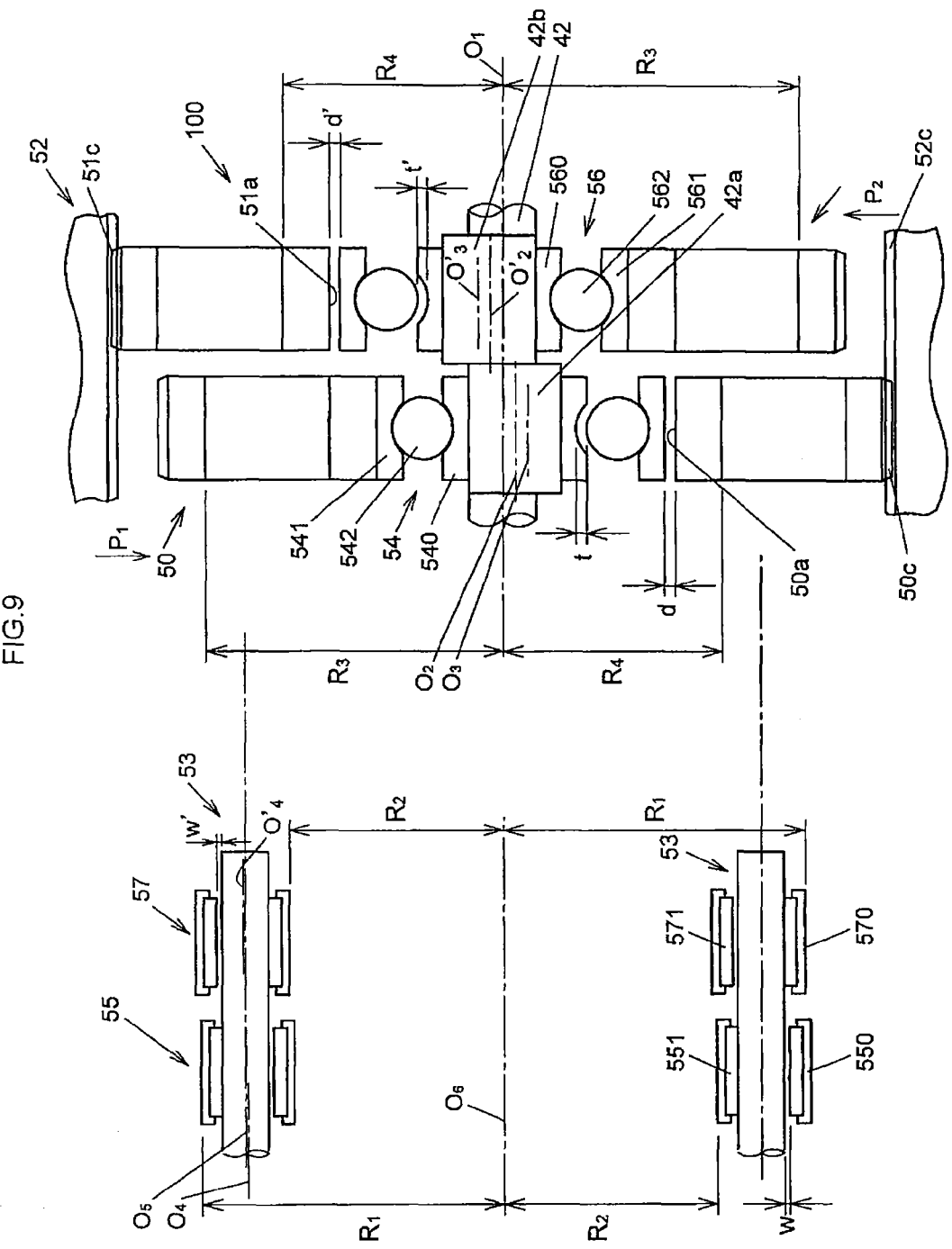
FIG. 9 is a simplified sectional view that shows a state where input members are supported by eccentric portions of a speed reduction mechanism and a state where second bearings are fitted to output members in a motor torque transmission device according to a second embodiment of the invention.

Next, a speed reduction mechanism in a motor torque transmission device according to a second embodiment of the invention will be described with reference to FIG. 9. FIG. 9 shows a state where input members are supported and a state where second bearings are fitted. In FIG. 9, the members having the functions which are the same as or equivalent to those in FIG. 5 are denoted by the same reference numerals as those in FIG. 5, and the detailed description is omitted.

As shown in FIG. 9, a reduction-transmission mechanism 100 (partially shown) according to the second embodiment of the invention is characterized in that the inner rings 540, 560 of the ball bearings 54, 56 are fitted to the outer peripheries of the eccentric portions 42a, 42b by interference fit, and the outer rings 541, 561 are fitted to the inner peripheries of the input members 50, 51, which define the center holes 50a, 51a, by clearance fit.

Therefore, on the input member 50 side, if a size obtained by subtracting the outside diameter of the outer ring 541 from the inside diameter of the input member 50, which defines the center hole 50a, is d and the operating clearance of the radial internal clearance in the ball bearing 54 is t, the size S (shown in FIG. 8A and FIG. 8B) is set to S=d+t.

In addition, if the operating clearance of the radial internal clearance in the needle roller bearing 55 is w, the radial internal clearance S$_2$ (shown in FIG. 7A and FIG. 7B) is set to S$_2$=w.

Similarly, on the input member 51 side, if a size obtained by subtracting the outside diameter of the outer ring 561 from the inside diameter of the input member 51, which defines the center hole 51a, is d' and the operating clearance of the radial internal clearance in the ball bearing 56 is t', the size S is set to S=d'+t'.

In addition, if the operating clearance of the radial internal clearance in the needle roller bearing 57 is w', the radial internal clearance S$_2$ is set to S$_2$=w'.

In the thus-configured reduction-transmission mechanism 100, when the input member 50 moves in the direction of the centrifugal force P$_1$ upon reception of a load due to the centrifugal force P$_1$ that is generated on the basis of the circular motion of the input member 50, the ball bearing 54 intensively receives the load due to the centrifugal force P$_1$ from the input member 50.

In addition, when the input member 51 moves in the direction of the centrifugal force P$_2$ upon reception of a load due to the centrifugal force $P_2$ that is generated on the basis of the circular motion of the input member 51, the ball bearing 56 intensively receives the load due to the centrifugal force $P_2$ from the input member 51.

Thus, in the present embodiment as well as in the first embodiment, application of the load due to the centrifugal force $P_1$ from the input member 50 to the needle roller bearings 55 and application of the load due to the centrifugal force $P_2$ from the input member 51 to the needle roller bearings 57 are suppressed. Thus, it is no longer necessary to use bearings having high durability as the needle roller bearings 55, 57.

According to the above-described second embodiment, similar advantageous effects to those of the first embodiment are obtained.

Figure 10:
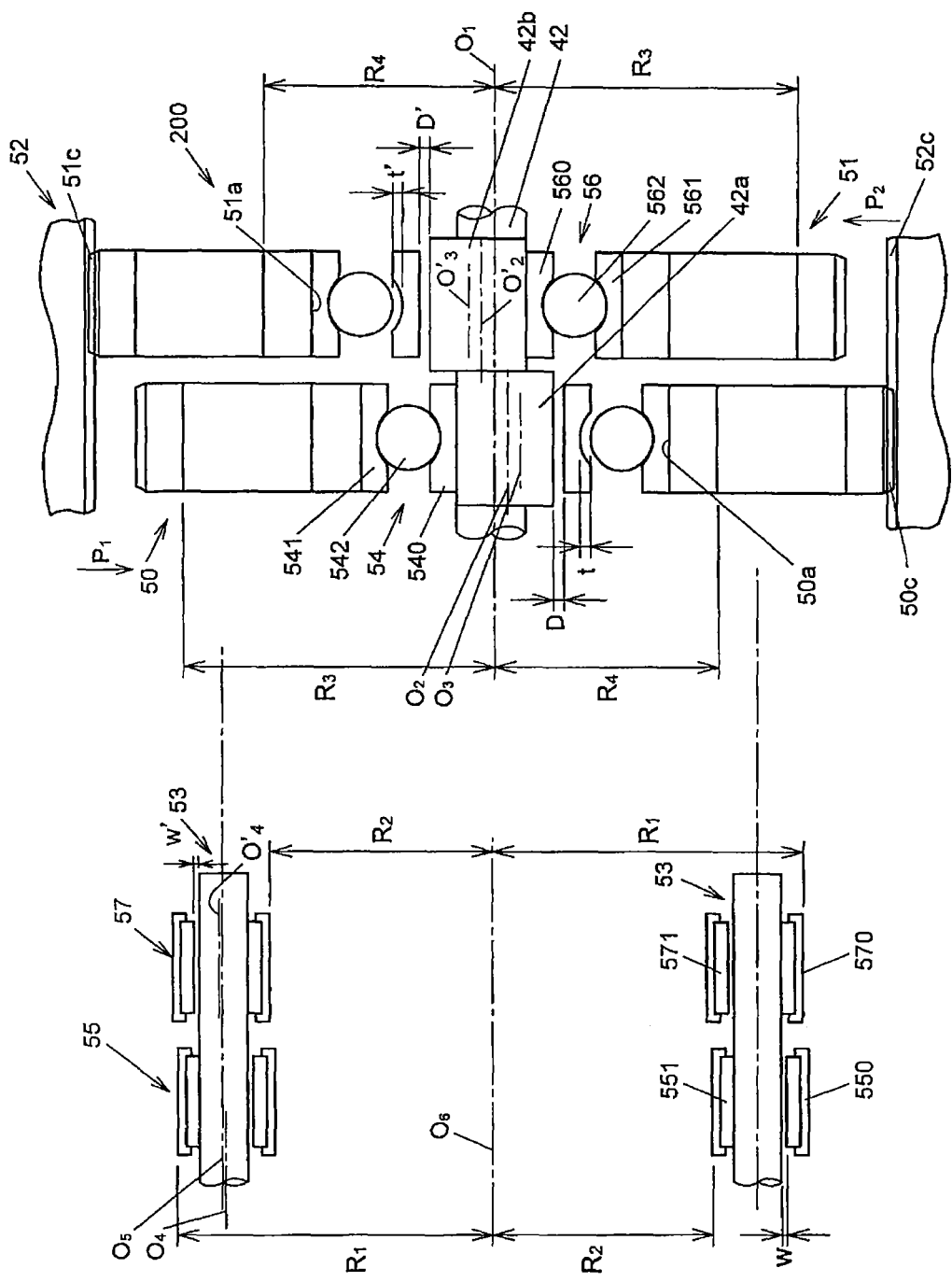
FIG. 10 is a simplified sectional view that shows a state where input members are supported by eccentric portions of a speed reduction mechanism and a state where second bearings are fitted to output members in a motor torque transmission device according to a third embodiment of the invention.

Next, a speed reduction mechanism in a motor torque transmission device according to a third embodiment of the invention will be described with reference to FIG. 10. FIG. 10 shows a state where input members are supported and a state where second bearings are fitted. In FIG. 10, the members having the functions which are the same as or equivalent to those in FIG. 5 are denoted by the same reference numerals as those in FIG. 5, and the detailed description is omitted.

As shown in FIG. 10, a reduction-transmission mechanism 200 (partially shown) according to the third embodiment of the invention is characterized in that the inner rings 540, 560 of the ball bearings 54, 56 are fitted to the outer peripheries of the eccentric portions 42a, 42b by clearance fit, and the outer rings 541, 561 are fitted to the inner peripheries of the center holes 50a, 51a by interference fit.

Therefore, on the input member 50 side, if a size obtained by subtracting the outside diameter of the eccentric portion 42a from the inside diameter of the inner ring 540 is D and the operating clearance of the radial internal clearance in the ball bearing 54 is t, the size S (shown in FIG. 8A and FIG. 8B) is set to S=D+t.

In addition, if the operating clearance of the radial internal clearance in the needle roller bearing 55 is w, the radial internal clearance $S_2$ (shown in FIG. 7A and FIG. 7B) is set to $S_2$=w.

Similarly, on the input member 51 side, if a size obtained by subtracting the outside diameter of the eccentric portion 42b from the inside diameter of the inner ring 560 is D' and the operating clearance of the radial internal clearance in the ball bearing 56 is t', the size S is set to S=D'+t'.

In addition, if the operating clearance of the radial internal clearance in the needle roller bearing 57 is w', the radial internal clearance $S_2$ is set to $S_2$=w'.

In the thus-configured reduction-transmission mechanism 200, when the input member 50 moves in the direction of the centrifugal force $P_1$ upon reception of a load due to the centrifugal force $P_1$ that is generated on the basis of the circular motion of the input member 50, the ball bearing 54 intensively receives the load due to the centrifugal force $P_1$ from the input member 50.

In addition, when the input member 51 moves in the direction of the centrifugal force $P_2$ upon reception of a load due to the centrifugal force $P_2$ that is generated on the basis of the circular motion of the input member 51, the ball bearing 56 intensively receives the load due to the centrifugal force $P_2$ from the input member 51.

Therefore, in the present embodiment as well as in the first embodiment, application of the load due to the centrifugal force $P_1$ from the input member 50 to the needle roller bearings 55 and application of the load due to the centrifugal force $P_2$ from the input member 51 to the needle roller bearings 57 are suppressed. Thus, it is no longer necessary to use bearings having high durability as the needle roller bearings 55, 57.

According to the above-described third embodiment, similar advantageous effects to those of the first embodiment are obtained.

Figure 11:
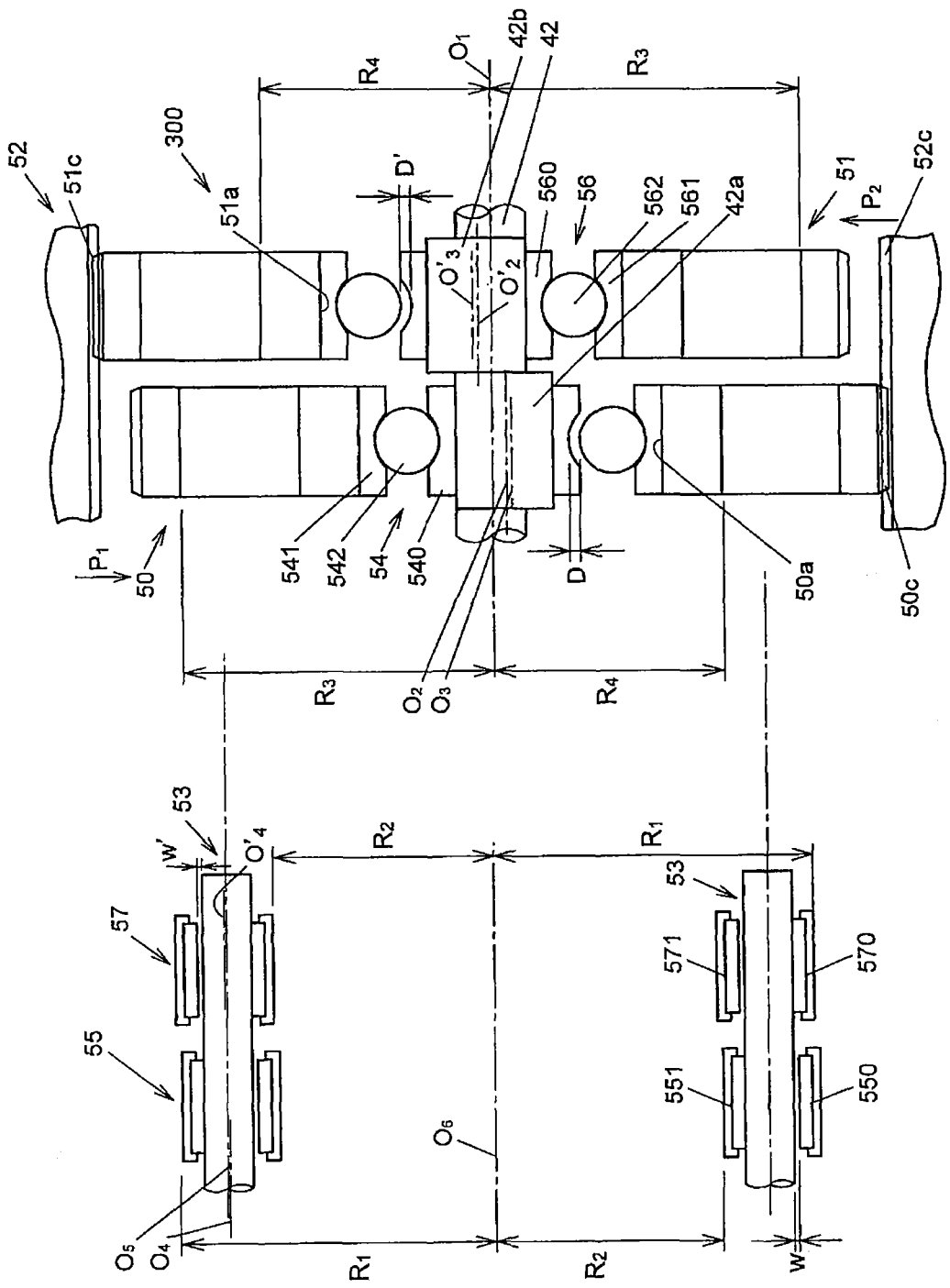
FIG. 11 is a simplified sectional view that shows a state where input members are supported by eccentric portions of a speed reduction mechanism and a state where second bearings are fitted to output members in a motor torque transmission device according to a fourth embodiment of the invention.
Figure 12:
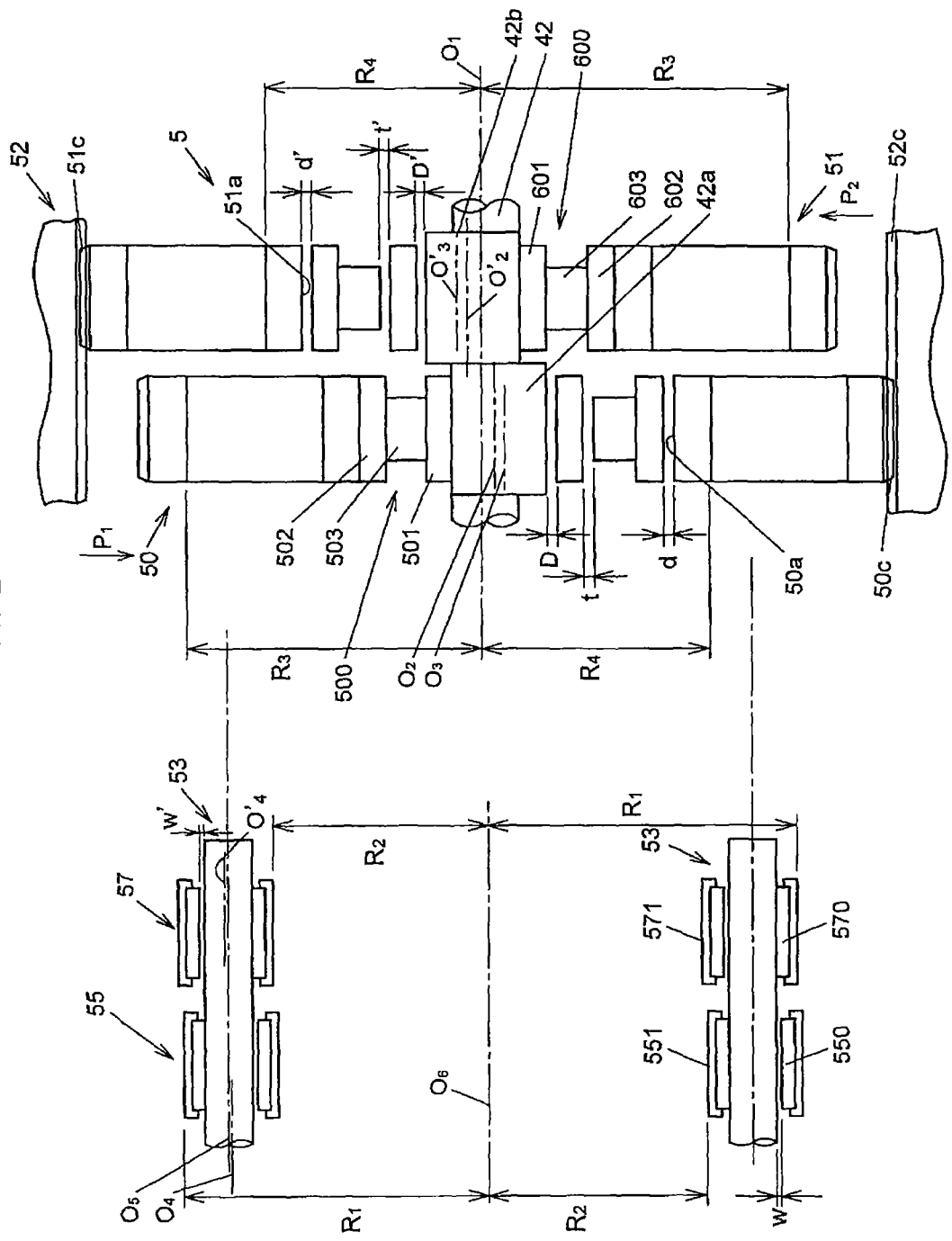
FIG. 12 is a simplified sectional view that shows a first modified example of the state where the input members are supported by the eccentric portions of the speed reduction mechanism and the state where the second bearings are fitted to the output members in the motor torque transmission device according to the first embodiment of the invention.
Figure 13:
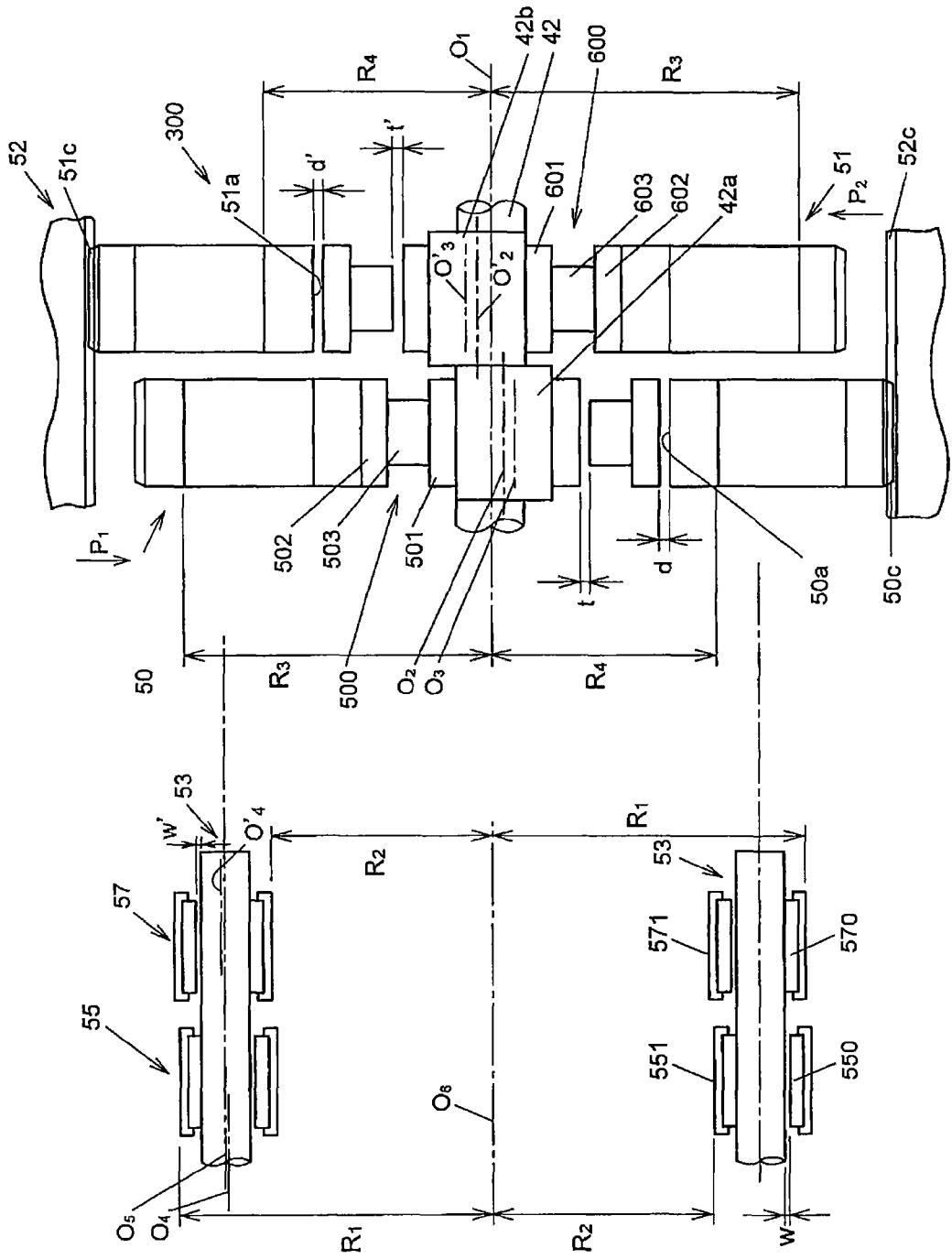
FIG. 13 is a simplified sectional view that shows a second modified example of the state where the input members are supported by the eccentric portions of the speed reduction mechanism and the state where the second bearings are fitted to the output members in the motor torque transmission device according to the second embodiment of the invention.
Figure 14:
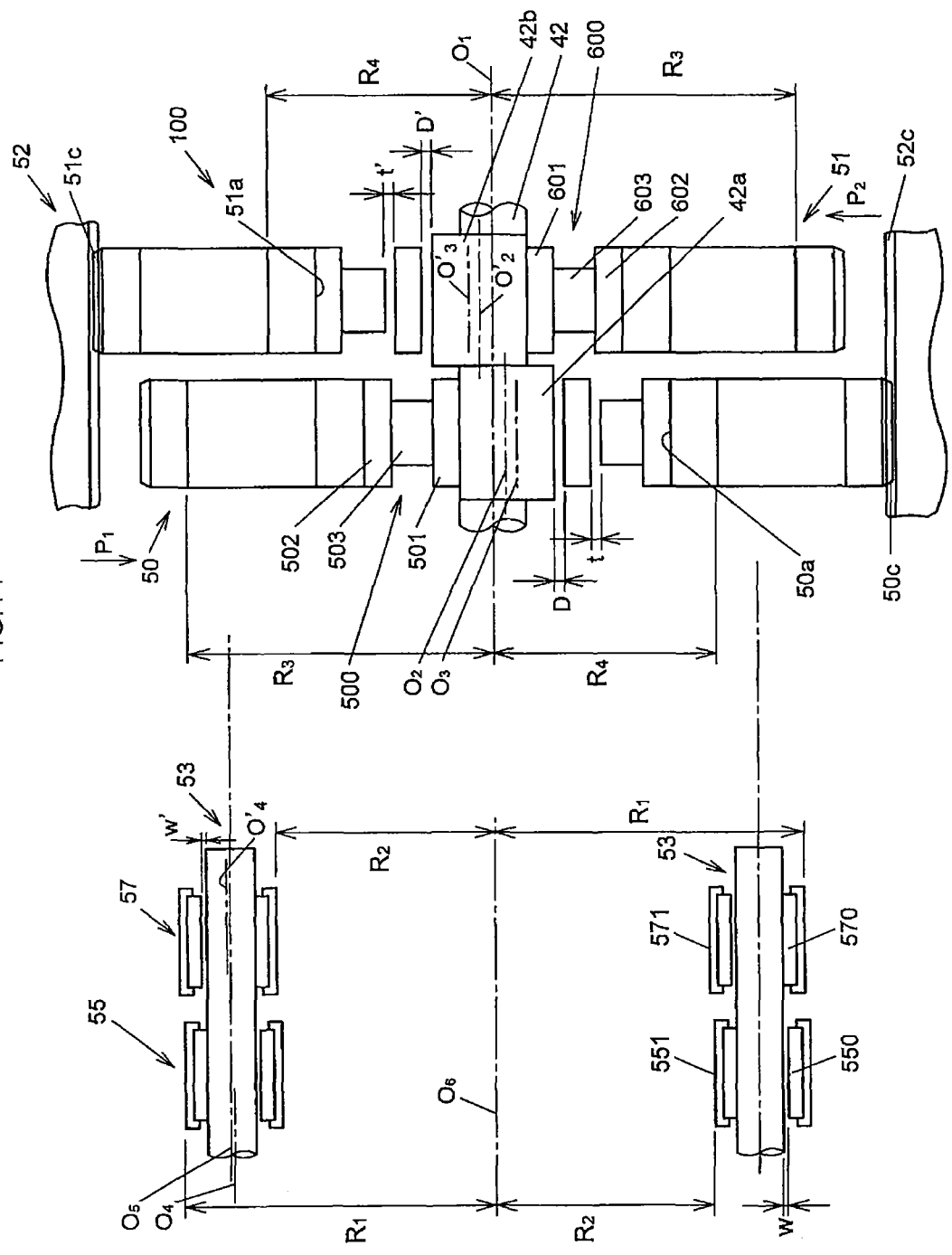
FIG. 14 is a simplified sectional view that shows a third modified example of the state where the input members are supported by the eccentric portions of the speed reduction mechanism and the state where the second bearings are fitted to the output members in the motor torque transmission device according to the third embodiment of the invention.
Figure 15:
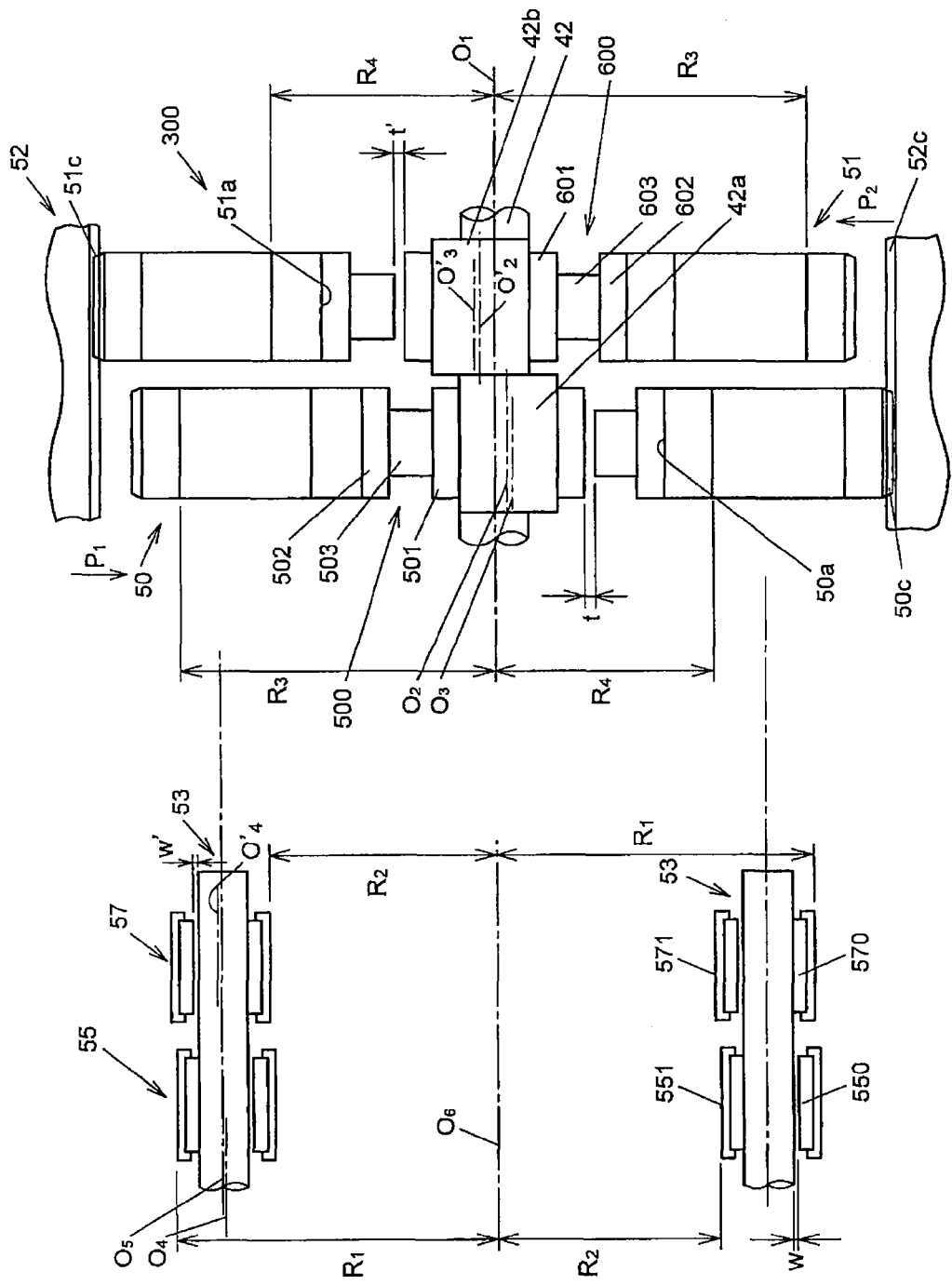
FIG. 15 is a simplified sectional view that shows a fourth modified example of the state where the input members are supported by the eccentric portions of the speed reduction mechanism and the state where the second bearings are fitted to the output members in the motor torque transmission device according to the fourth embodiment of the invention.

Next, a speed reduction mechanism in a motor torque transmission device according to a fourth embodiment of the invention will be described with reference to FIG. 11. FIG. 11 shows a state where input members are supported and a state where second bearings are fitted. In FIG. 11, the members having the functions which are the same as or equivalent to those in FIG. 5 are denoted by the same reference numerals as those in FIG. 5, and the detailed description is omitted.

As shown in FIG. 11, a reduction-transmission mechanism 300 (partially shown) according to the fourth embodiment of the invention is characterized in that the inner rings 540, 560 of the ball bearings 54, 56 are fitted to the outer peripheries of the eccentric portions 42a, 42b by interference fit, and the outer rings 541, 561 are fitted to the inner peripheries of the input members 50, 51, which define the center holes 50a, 51a, by interference fit.

Therefore, on the input member 50 side, if the operating clearance of the radial internal clearance in the ball bearing 54 is t, the size S (shown in FIG. 8A and FIG. 8B) is set to S=t.

In addition, if the operating clearance of the radial internal clearance in each needle roller bearing 55 is w, the radial internal clearance $S_2$ (shown in FIG. 7A and FIG. 7B) is set to $S_2$=w.

Similarly, on the input member 51 side, if the operating clearance of the radial internal clearance in the ball bearing 56 is t', the size S is set to S=t'.

In addition, if the operating clearance of the radial internal clearance in each needle roller bearing 57 is w', the radial internal clearance $S_2$ is set to $S_2$=w'.

In the thus-configured reduction-transmission mechanism 300, when the input member 50 moves in the direction of the centrifugal force $P_1$ upon reception of a load due to the centrifugal force $P_1$ that is generated on the basis of the circular motion of the input member 50, the ball bearing 54 intensively receives the load due to the centrifugal force $P_1$ from the input member 50.

In addition, when the input member 51 moves in the direction of the centrifugal force $P_2$ upon reception of a load due to the centrifugal force $P_2$ that is generated on the basis of the circular motion of the input member 51, the ball bearing 56 intensively receives the load due to the centrifugal force $P_2$ from the input member 51.

Therefore, in the present embodiment as well as in the first embodiment, application of the load due to the centrifugal force $P_1$ from the input member 50 to the needle roller bearings 55 and application of the load due to the centrifugal force $P_2$ from the input member 51 to the needle roller bearings 57 are suppressed. Thus, it is no longer necessary to use bearings having high durability as the needle roller bearings 55, 57.

According to the above-described fourth embodiment, similar advantageous effects to those of the first embodiment are obtained.

As described above, the speed reduction mechanism according to the invention and the motor torque transmission device that includes the speed reduction mechanism are described on the basis of the above-described embodiments. However, the invention is not limited to the above-described embodiments. The invention may be implemented in various other embodiments without departing from the scope of the invention, and, for example, the following modified examples are also possible.

(1) In the above-described embodiments, the eccentric portion 42a and the eccentric portion 42b are arranged on the outer periphery of the motor shaft 42 such that the distance from the axis $O_2$ to the rotation axis $O_1$ and the distance from the axis $O'_2$ to the rotation axis $O_1$ are equal to each other and the distance between the axis $O_2$ and the axis $O'_2$ in one of the circumferential directions around the rotation axis $O_1$ and the distance between the axis $O_2$ and the axis $O'_2$ in the other circumferential direction around the rotation axis $O_1$ are equal to each other, and the input members 50, 51 are arranged on the portions that are formed on the motor shaft 42 of the electric motor 4 so as to be apart from each other in the circumferential direction around the axis (rotation axis $O_1$) of the motor shaft 42 at equal intervals (180°). However, the invention is not limited to this configuration, and the number of the input members may be appropriately changed.

That is, when the number of the input members is n (n≥3), the axis of the first eccentric portion, the axis of the second eccentric portion, . . . , and the axis of the nth eccentric portion are sequentially arranged in one direction around the axis of the motor shaft, on an imaginary plane perpendicular to the axis of the electric motor (motor shaft). Then, the eccentric portions are arranged on the outer periphery of the motor shaft such that the distance from the axis of each eccentric portion to the axis of the motor shaft is equal to one another and an angle formed between line segments that connect the axis of the motor shaft to the respective axes of adjacent two eccentric portions among the first eccentric portion, the second eccentric portion, . . . , and the nth eccentric portion is set to 360°/n. Furthermore, the n input members are arranged on the motor shaft at portions that are apart from each other at intervals of 360°/n around the axis of the motor shaft.

For example, when the number of the input members is three, the axis of the first eccentric portion, the axis of the second eccentric portion and the axis of the third eccentric portion are sequentially arranged in one direction around the axis of the motor shaft, on an imaginary plane perpendicular to the axis of the motor shaft. The eccentric portions are arranged on the outer periphery of the motor shaft such that the distance from the axis of each eccentric portion to the axis of the motor shaft is equal to one another and an angle formed between line segments that connect the axis of the motor shaft to the respective axes of adjacent two eccentric portions among the first eccentric portion, the second eccentric portion and the third eccentric portion is set to 120°. Furthermore, the three input members are arranged on the motor shaft at portions that are apart from each other at intervals of 120° around the axis of the motor shaft.

(2) In the above-described embodiments, the description is made on the case where the needle roller bearings 55, 57 that serve as the second bearings are formed of the outer rings 550, 570 and the needle rollers 551, 571, respectively. However, the invention is not limited to this configuration. The needle roller bearings each may be formed of an inner ring arranged radially outward of the output member, an outer ring arranged radially outward of the inner ring and needle rollers interposed between the outer ring and the inner ring. In this case, the size S' is set to one of $S'=S_0+S_1+S_2$, $S'=S_0+S_2$, $S'=S_1+S_2$, and $S'=S_2$.

(3) In the above-described embodiments, the description is made on the case where the invention is applied to the four-wheel-drive vehicle 101 that uses the engine 102 and the electric motor 4 as the driving sources. However, the invention is not limited to this configuration. The invention may also be applied to an electric vehicle, which is a four-wheel-drive vehicle or a two-wheel drive vehicle, using only an electric motor as a driving source. In addition, the invention may also be applied to a four-wheel-drive vehicle having first drive shafts that are driven by an engine and an electric motor and second drive shafts that are driven by an electric motor as in the above-described embodiments.

(4) In the above-described embodiments, the description is made on the case where the ball bearings 54, 56 that are deep groove ball bearings are used as first bearings between the inner peripheries of the input members 50, 51, which define the center holes 50*a*, 51*a*, and the outer peripheries of the eccentric portions 42*a*, 42*b* such that the input members 50, 51 are rotatably supported on the eccentric portions 42*a*, 42*b*. However, the invention is not limited to this configuration, and ball bearings or roller bearings, other than deep groove ball bearings, may be used as first bearings instead of the deep groove ball bearings. Such a ball bearing or a roller bearing may be, for example, an angular contact ball bearing, a needle roller bearing, a long cylindrical roller bearing, a cylindrical roller bearing, a tapered roller bearing, a spherical roller bearing, or the like. In addition, the first bearing according to the invention may be a plain bearing instead of a rolling bearing.

For example, as shown in FIG. 12 to FIG. 15, when a needle roller bearing 500 (an inner ring 501, an outer ring 502, and rolling elements 503) and a needle roller bearing 600 (an inner ring 601, an outer ring 602, rolling elements 603) are used as the first bearings, the input member 50 is rotatably supported by the eccentric portion 42*a* via the needle roller bearing 500, and the input member 51 is rotatably supported by the eccentric portion 42*b* via the needle roller bearing 600. In this case, FIG. 12, FIG. 13, FIG. 14, FIG. 15 respectively correspond to FIG. 5, FIG. 9, FIG. 10, and FIG. 11, the needle roller bearing 500 instead of the ball bearing 54 described in the above-described embodiments is interposed between the inner periphery of the input member 50, which defines the center hole 50*a*, and the outer periphery of the eccentric portion 42*a*, and the needle roller bearing 600 instead of the ball bearing 56 described in the above-described embodiments is interposed between the inner periphery of the input member 51, which defines the center hole 51*a*, and the outer periphery of the eccentric portion 42*b*.

(5) In the above-described embodiments, the description is made on the case where the needle roller bearing 55 that serves as a second bearing and that is able to contact the inner periphery of the input member 50, which defines a corresponding one of the pin insertion holes 50*b*, is fitted to the outer periphery of each of the output members 53 at a portion between the threaded portion 53*a* and the head 53*b*, and the needle roller bearing 57 that serves as a second bearing and that is able to contact the inner periphery of the input member 51, which defines a corresponding one of the pin insertion holes 51*b*, is fitted to the outer periphery of each of the output members 53 at a portion between the threaded portion 53*a* and the head 53*b*. However, the invention is not limited to this configuration. A roller bearing other than a needle roller bearing or a ball bearing may be used instead of the needle roller bearing. Such a ball bearing or a roller bearing may be, for example, a deep groove ball bearing, an angular contact ball bearing, a cylindrical roller bearing, a long cylindrical roller bearing, a tapered roller bearing, a spherical roller bearing, or the like. In addition, the second bearing according to the invention may be a plain bearing instead of a rolling bearing.

What is claimed is:
1. A speed reduction mechanism, comprising:
a rotary shaft that rotates about a first axis and that has an eccentric portion of which a central axis is a second axis that is offset from the first axis;
an input member that is arranged radially outward of the rotary shaft, that has a center hole of which a central axis is a third axis and a plurality of through-holes arranged at equal intervals around the third axis, and that is formed of an external gear provided with a first bearing interposed between an inner periphery of the input member, which defines the center hole, and an outer periphery of the eccentric portion;

a rotation force applying member that is in mesh with the input member and that is formed of an internal gear having teeth the number of which is larger than the number of teeth of the external gear; and a plurality of output members that receive rotation force applied to the input member by the rotation force applying member, that output the rotation force to an output target as torque of the output target, and that are passed through the respective through-holes with second bearings provided radially outward of the respective output members, wherein the second bearings are to be rotated at a revolving speed greater than that of the first bearings, wherein the input member is arranged at such a position that a size S obtained by adding a fitting clearance formed between the first bearing and the outer periphery of the eccentric portion, a fitting clearance formed between the first bearing and the inner periphery of the input member, which defines the center hole, and a radial internal clearance of the first bearing is smaller than a size S' obtained by adding a fitting clearance formed between an outer periphery of each of the output members and a corresponding one of the second bearings, a fitting clearance formed between each of the second bearings and an inner periphery of the input member, which defines a corresponding one of the through-holes, and a radial internal clearance of each of the second bearings.

2. The speed reduction mechanism according to claim 1, wherein:

the first bearing includes an inner ring arranged radially outward of the eccentric portion, an outer ring arranged radially outward of the inner ring, and rolling elements interposed between the outer ring and the inner ring; and where a size obtained by subtracting an outside diameter of the eccentric portion from an inside diameter of the inner ring is D, a size obtained by subtracting an outside diameter of the outer ring from an inside diameter of the input member, which defines the center hole, is d, and an operating clearance of the radial internal clearance in the first bearing is t, the size S is set to one of S=D+d+t, S=d+t, S=D+t, and S=t.

3. A motor torque transmission device, comprising:
an electric motor that generates motor torque; and
a speed reduction mechanism that reduces a speed of rotation transmitted from the electric motor and that outputs driving force, wherein
the speed reduction mechanism is the speed reduction mechanism according to claim 2.

4. The speed reduction mechanism according to claim 1, wherein:

the first bearing has an inner ring raceway surface formed on the outer periphery of the eccentric portion, and includes an outer ring arranged radially outward of the inner ring raceway surface, and rolling elements interposed between the outer ring and the inner ring raceway surface; and where a size obtained by subtracting an outside diameter of the outer ring from an inside diameter of the input member, which defines the center hole, is d, and an operating clearance of the radial internal clearance in the first bearing is t, the size S is set to S=d+t, or S=t.

5. A motor torque transmission device, comprising:
an electric motor that generates motor torque; and
a speed reduction mechanism that reduces a speed of rotation transmitted from the electric motor and that outputs driving force, wherein
the speed reduction mechanism is the speed reduction mechanism according to claim 4.

6. The speed reduction mechanism according to claim 1, wherein:

the first bearing has an outer ring raceway surface formed on the inner periphery of the input member, which defines the center hole, and includes an inner ring arranged radially inward of the outer ring raceway surface and rolling elements interposed between the inner ring and the outer ring raceway surface; and where a size obtained by subtracting an outside diameter of the eccentric portion from an inside diameter of the inner ring is D and an operating clearance in the radial internal clearance in the first bearing is t, the size S is set to S=D+t, or S=t.

7. A motor torque transmission device, comprising:
an electric motor that generates motor torque; and
a speed reduction mechanism that reduces a speed of rotation transmitted from the electric motor and that outputs driving force, wherein
the speed reduction mechanism is the speed reduction mechanism according to claim 6.

8. The speed reduction mechanism according to claim 1, wherein:

the first bearing has an inner ring raceway surface formed on the outer periphery of the eccentric portion and an outer ring raceway surface formed on the inner periphery of the input member, which defines the center hole, and includes rolling elements interposed between the outer ring raceway surface and the inner ring raceway surface; and where an operating clearance of the radial internal clearance in the first bearing is t, the size S is set to S=t.

9. A motor torque transmission device, comprising:
an electric motor that generates motor torque; and
a speed reduction mechanism that reduces a speed of rotation transmitted from the electric motor and that outputs driving force, wherein
the speed reduction mechanism is the speed reduction mechanism according to claim 8.

10. The speed reduction mechanism according to claim 1, wherein:

each of the second bearings has an inner ring raceway surface formed on the outer periphery of a corresponding one of the output members, and includes an outer ring arranged radially outward of the inner ring raceway surface and rolling elements interposed between the outer ring and the inner ring raceway surface; and where a fitting clearance formed between an outer periphery of each of the outer rings and the inner periphery of the input member, which defines a corresponding one of the through-holes, is $S_1$ and the radial internal clearance of each of the second bearings is $S_2$, the size S' is set to one of S'=$S_1$+$S_2$, and S'=$S_2$.

11. A motor torque transmission device, comprising:
an electric motor that generates motor torque; and
a speed reduction mechanism that reduces a speed of rotation transmitted from the electric motor and that outputs driving force, wherein
the speed reduction mechanism is the speed reduction mechanism according to claim 10.

12. The speed reduction mechanism according to claim 1, wherein:

each of the second bearings includes an inner ring arranged radially outward of a corresponding one of the output members, an outer ring arranged radially outward of the inner ring and rolling elements interposed between the outer ring and the inner ring; and where a fitting clearance formed between the outer periphery of the output member and an inner periphery of the inner ring is $S_0$, a fitting clearance formed between an outer periphery of the outer ring and the inner periphery of the input member, which defines a corresponding one of the through-holes, is $S_1$ and the radial internal clearance of each of the second bearings is $S_2$, the size S' is set to one of $S'=S_0+S_1+S_2$, $S'=S_0+S_2$, $S'=S_1+S_2$, and $S'=S_2$.

13. A motor torque transmission device, comprising:

an electric motor that generates motor torque; and a speed reduction mechanism that reduces a speed of rotation transmitted from the electric motor and that outputs driving force, wherein the speed reduction mechanism is the speed reduction mechanism according to claim 12.

14. A motor torque transmission device, comprising:

an electric motor that generates motor torque; and a speed reduction mechanism that reduces a speed of rotation transmitted from the electric motor and that outputs driving force, wherein the speed reduction mechanism is the speed reduction mechanism according to claim 1.

* * * * *